United States Patent
Kakko-Chiloff et al.

(10) Patent No.: US 11,985,069 B2
(45) Date of Patent: May 14, 2024

(54) AUTO-DETECTION OF APPLICATION FAILURES FOR FORECASTING NETWORK PATH PERFORMANCE

(71) Applicant: Cisco Technology, Inc., San Jose, CA (US)

(72) Inventors: Romain Kakko-Chiloff, Paris (FR); Mukund Yelahanka Raghuprasad, San Jose, CA (US); Vinay Kumar Kolar, San Jose, CA (US); Jean-Philippe Vasseur, Saint Martin d'Uriage (FR)

(73) Assignee: Cisco Technology, Inc., San Jose, CA (US)

( * ) Notice: Subject to any disclaimer, the term of this patent is extended or adjusted under 35 U.S.C. 154(b) by 0 days.

(21) Appl. No.: 17/877,987

(22) Filed: Jul. 31, 2022

(65) Prior Publication Data

US 2024/0039856 A1 Feb. 1, 2024

(51) Int. Cl.
*H04L 41/16* (2022.01)
*H04L 41/147* (2022.01)
*H04L 47/2425* (2022.01)

(52) U.S. Cl.
CPC ........ *H04L 47/2425* (2013.01); *H04L 41/147* (2013.01); *H04L 41/16* (2013.01)

(58) Field of Classification Search
CPC .... H04L 41/16; H04L 41/2425; H04L 41/147
See application file for complete search history.

(56) References Cited

U.S. PATENT DOCUMENTS

| 10,127,125 B2 | 11/2018 | Krishnan et al. |
| 10,635,519 B1 | 4/2020 | Tang et al. |
| 10,761,958 B2 | 9/2020 | Sobala et al. |

(Continued)

FOREIGN PATENT DOCUMENTS

| WO | WO-0117169 A2 * | 3/2001 | ......... H04L 41/0213 |
| WO | 2021243342 A1 | 12/2021 | |

OTHER PUBLICATIONS

Islam, et al., "Predicting Application Failure in Cloud: A Machine Learning Approach", 2017 IEEE 1st International Conference on Cognitive Computing, Jun. 2017, pp. 24-31, IEEE, Honolulu, HI.

(Continued)

*Primary Examiner* — Adnan M Mirza
(74) *Attorney, Agent, or Firm* — BEHMKE INNOVATION GROUP LLC; James M. Behmke; James J. Wong

(57) ABSTRACT

In one embodiment, a device provides, to a user interface, a timeseries for display of a probability over time of a network path violating a service level agreement (SLA) associated with an online application. The device receives, from the user interface, a plurality of thresholds for the timeseries that define periods of time during which application experience of the online application is believed to be degraded. The device trains, based on the plurality of thresholds, a machine learning model to predict when the application experience of the online application will be degraded. The device causes a predictive routing engine to reroute traffic of the online application based on a prediction by the machine learning model that the application experience of the online application will be degraded.

18 Claims, 17 Drawing Sheets

(56) References Cited

U.S. PATENT DOCUMENTS

| | | | | |
|---|---|---|---|---|
| 2010/0118709 A1* | 5/2010 | Bajpay | ................ | H04L 41/5009 |
| | | | | 370/242 |
| 2020/0153701 A1* | 5/2020 | Mohan | ................ | H04L 41/5009 |
| 2020/0344267 A1* | 10/2020 | Adam | ................. | H04L 63/1425 |

OTHER PUBLICATIONS

"Application Aware Network Performance Management", online: https://www.manageengine.com/network-monitoring/application-aware-network-performance-management.html, Feb. 2015, accessed Jul. 2020, 5 pages.

\* cited by examiner

… (1)

AUTO-DETECTION OF APPLICATION FAILURES FOR FORECASTING NETWORK PATH PERFORMANCE

TECHNICAL FIELD

The present disclosure relates generally to computer networks, and, more particularly, to the automatic detection of application failures for forecasting network path performance.

BACKGROUND

With the recent evolution of machine learning, predictive failure detection and proactive routing in a network now becomes possible through the use of machine learning techniques. For instance, modeling the delay, jitter, packet loss, etc. for a network path can be used to predict when that path will violate the service level agreement (SLA) of the application and reroute the traffic, in advance. However, rerouting application is not without cost and needlessly rerouting traffic can have the opposite intended effect of decreasing the application experience. Thus, tradeoffs can be made between being too aggressive and not aggressive enough. In addition, these tradeoffs are largely subjective from the standpoint of a network administrator.

BRIEF DESCRIPTION OF THE DRAWINGS

The embodiments herein may be better understood by referring to the following description in conjunction with the accompanying drawings in which like reference numerals indicate identically or functionally similar elements, of which.

DESCRIPTION OF EXAMPLE EMBODIMENTS

Overview

Figure 1A:
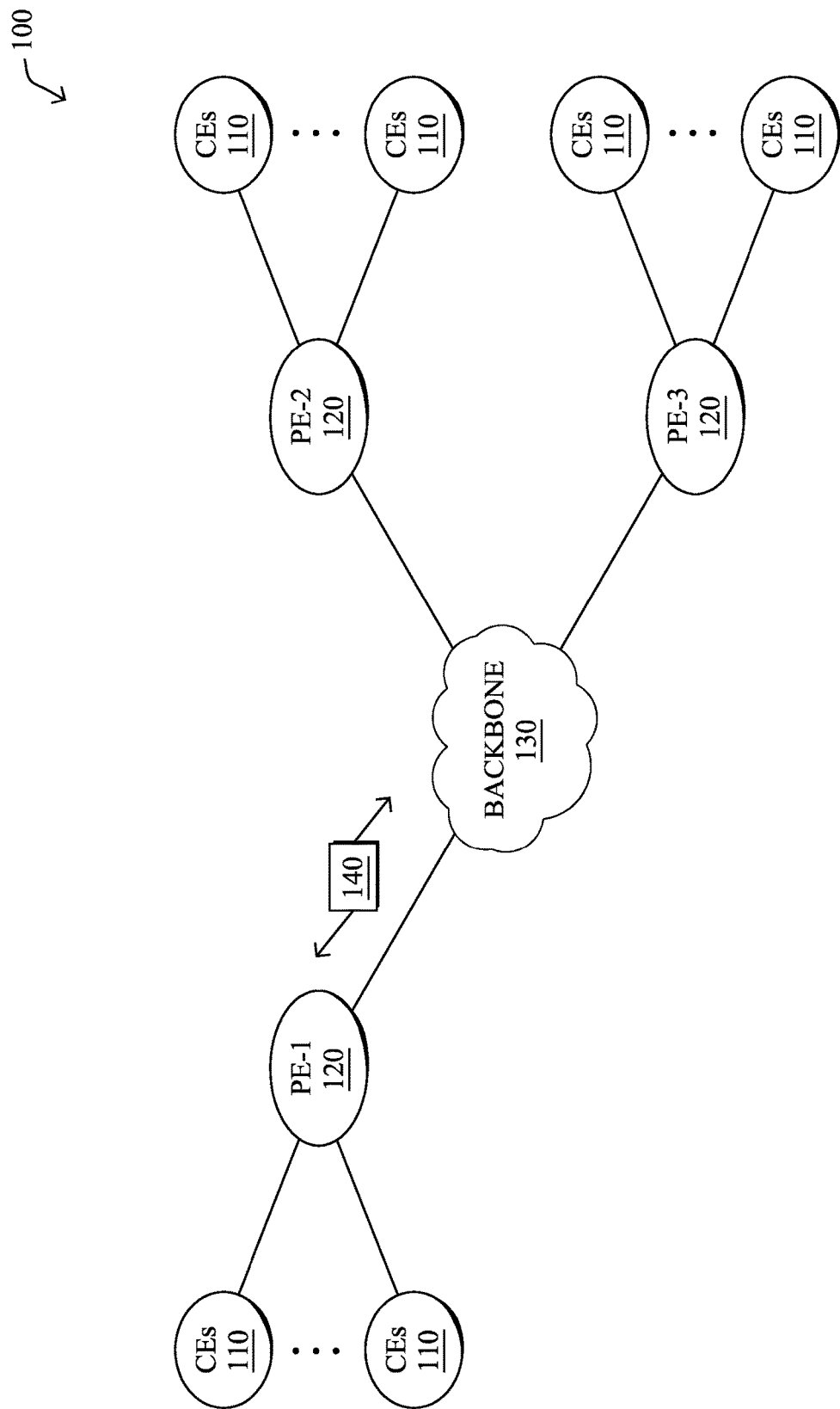
FIGS. 1A-1B illustrate an example communication network.

According to one or more embodiments of the disclosure, a device provides, to a user interface, a timeseries for display of a probability over time of a network path violating a service level agreement (SLA) associated with an online application. The device receives, from the user interface, a plurality of thresholds for the timeseries that define periods of time during which application experience of the online application is believed to be degraded. The device trains, based on the plurality of thresholds, a machine learning model to predict when the application experience of the online application will be degraded. The device causes a predictive routing engine to reroute traffic of the online application based on a prediction by the machine learning model that the application experience of the online application will be degraded.

DESCRIPTION

A computer network is a geographically distributed collection of nodes interconnected by communication links and segments for transporting data between end nodes, such as personal computers and workstations, or other devices, such as sensors, etc. Many types of networks are available, with the types ranging from local area networks (LANs) to wide area networks (WANs). LANs typically connect the nodes over dedicated private communications links located in the same general physical location, such as a building or campus. WANs, on the other hand, typically connect geographically dispersed nodes over long-distance communications links, such as common carrier telephone lines, optical lightpaths, synchronous optical networks (SONET), or synchronous digital hierarchy (SDH) links, or Powerline Communications (PLC) such as IEEE 61334, IEEE P1901.2, and others. The Internet is an example of a WAN that connects disparate networks throughout the world, providing global communication between nodes on various networks. The nodes typically communicate over the network by exchanging discrete frames or packets of data according to predefined protocols, such as the Transmission Control Protocol/Internet Protocol (TCP/IP). In this context, a protocol consists of a set of rules defining how the nodes interact with each other. Computer networks may be further interconnected by an intermediate network node, such as a router, to extend the effective "size" of each network.

Smart object networks, such as sensor networks, in particular, are a specific type of network having spatially distributed autonomous devices such as sensors, actuators, etc., that cooperatively monitor physical or environmental conditions at different locations, such as, e.g., energy/power consumption, resource consumption (e.g., water/gas/etc. for advanced metering infrastructure or "AMI" applications) temperature, pressure, vibration, sound, radiation, motion, pollutants, etc. Other types of smart objects include actuators, e.g., responsible for turning on/off an engine or perform any other actions. Sensor networks, a type of smart object network, are typically shared-media networks, such as wireless or PLC networks. That is, in addition to one or more sensors, each sensor device (node) in a sensor network may generally be equipped with a radio transceiver or other communication port such as PLC, a microcontroller, and an energy source, such as a battery. Often, smart object networks are considered field area networks (FANs), neighborhood area networks (NANs), personal area networks (PANs), etc. Generally, size and cost constraints on smart object nodes (e.g., sensors) result in corresponding constraints on resources such as energy, memory, computational speed and bandwidth.

FIG. 1A is a schematic block diagram of an example computer network 100 illustratively comprising nodes/devices, such as a plurality of routers/devices interconnected by links or networks, as shown. For example, customer edge (CE) routers 110 may be interconnected with provider edge (PE) routers 120 (e.g., PE-1, PE-2, and PE-3) in order to communicate across a core network, such as an illustrative network backbone 130. For example, routers 110, 120 may be interconnected by the public Internet, a multiprotocol label switching (MPLS) virtual private network (VPN), or the like. Data packets 140 (e.g., traffic/messages) may be exchanged among the nodes/devices of the computer network 100 over links using predefined network communication protocols such as the Transmission Control Protocol/Internet Protocol (TCP/IP), User Datagram Protocol (UDP), Asynchronous Transfer Mode (ATM) protocol, Frame Relay protocol, or any other suitable protocol. Those skilled in the art will understand that any number of nodes, devices, links, etc. may be used in the computer network, and that the view shown herein is for simplicity.

In some implementations, a router or a set of routers may be connected to a private network (e.g., dedicated leased lines, an optical network, etc.) or a virtual private network (VPN), such as an MPLS VPN thanks to a carrier network, via one or more links exhibiting very different network and service level agreement characteristics. For the sake of illustration, a given customer site may fall under any of the following categories:

1.) Site Type A: a site connected to the network (e.g., via a private or VPN link) using a single CE router and a single link, with potentially a backup link (e.g., a 3G/4G/5G/LTE backup connection). For example, a particular CE router 110 shown in network 100 may support a given customer site, potentially also with a backup link, such as a wireless connection.

2.) Site Type B: a site connected to the network by the CE router via two primary links (e.g., from different Service Providers), with potentially a backup link (e.g., a 3G/4G/5G/LTE connection). A site of type B may itself be of different types:

2a.) Site Type B1: a site connected to the network using two MPLS VPN links (e.g., from different Service Providers), with potentially a backup link (e.g., a 3G/4G/5G/LTE connection).

2b.) Site Type B2: a site connected to the network using one MPLS VPN link and one link connected to the public Internet, with potentially a backup link (e.g., a 3G/4G/5G/LTE connection). For example, a particular customer site may be connected to network 100 via PE-3 and via a separate Internet connection, potentially also with a wireless backup link.

2c.) Site Type B3: a site connected to the network using two links connected to the public Internet, with potentially a backup link (e.g., a 3G/4G/5G/LTE connection).

Notably, MPLS VPN links are usually tied to a committed service level agreement, whereas Internet links may either have no service level agreement at all or a loose service level agreement (e.g., a "Gold Package" Internet service connection that guarantees a certain level of performance to a customer site).

3.) Site Type C: a site of type B (e.g., types B1, B2 or B3) but with more than one CE router (e.g., a first CE router connected to one link while a second CE router is connected to the other link), and potentially a backup link (e.g., a wireless 3G/4G/5G/LTE backup link). For example, a particular customer site may include a first CE router 110 connected to PE-2 and a second CE router 110 connected to PE-3.

Figure 1B:
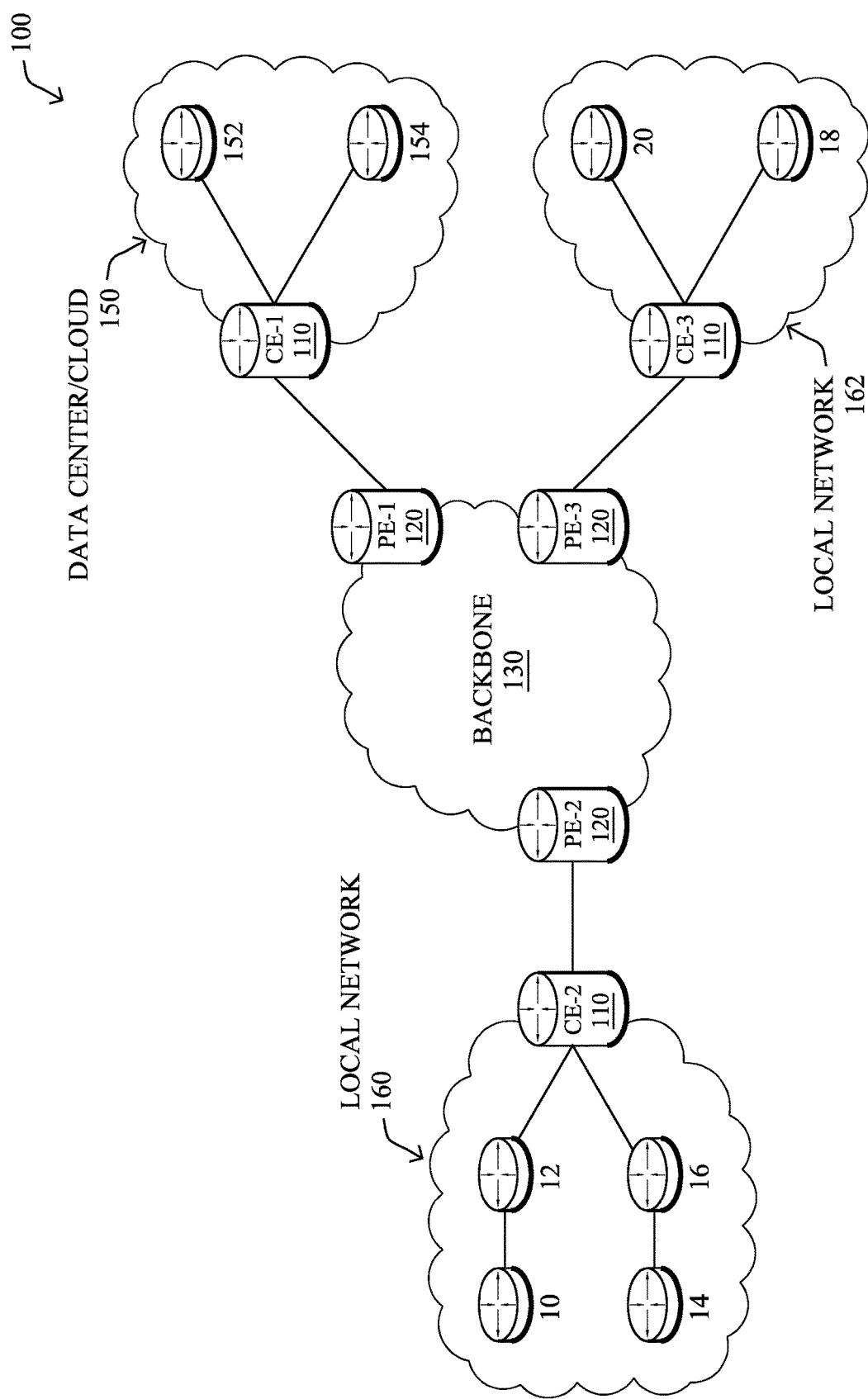

FIG. 1B illustrates an example of network 100 in greater detail, according to various embodiments. As shown, network backbone 130 may provide connectivity between devices located in different geographical areas and/or different types of local networks. For example, network 100 may comprise local/branch networks 160, 162 that include devices/nodes 10-16 and devices/nodes 18-20, respectively, as well as a data center/cloud environment 150 that includes servers 152-154. Notably, local networks 160-162 and data center/cloud environment 150 may be located in different geographic locations.

Servers 152-154 may include, in various embodiments, a network management server (NMS), a dynamic host configuration protocol (DHCP) server, a constrained application protocol (CoAP) server, an outage management system (OMS), an application policy infrastructure controller (APIC), an application server, etc. As would be appreciated, network 100 may include any number of local networks, data centers, cloud environments, devices/nodes, servers, etc.

In some embodiments, the techniques herein may be applied to other network topologies and configurations. For example, the techniques herein may be applied to peering points with high-speed links, data centers, etc.

According to various embodiments, a software-defined WAN (SD-WAN) may be used in network 100 to connect local network 160, local network 162, and data center/cloud environment 150. In general, an SD-WAN uses a software defined networking (SDN)-based approach to instantiate tunnels on top of the physical network and control routing decisions, accordingly. For example, as noted above, one tunnel may connect router CE-2 at the edge of local network 160 to router CE-1 at the edge of data center/cloud environment 150 over an MPLS or Internet-based service provider network in backbone 130. Similarly, a second tunnel may also connect these routers over a 4G/5G/LTE cellular service provider network. SD-WAN techniques allow the WAN functions to be virtualized, essentially forming a virtual connection between local network 160 and data center/cloud environment 150 on top of the various underlying connections. Another feature of SD-WAN is centralized management by a supervisory service that can monitor and adjust the various connections, as needed.

Figure 2:
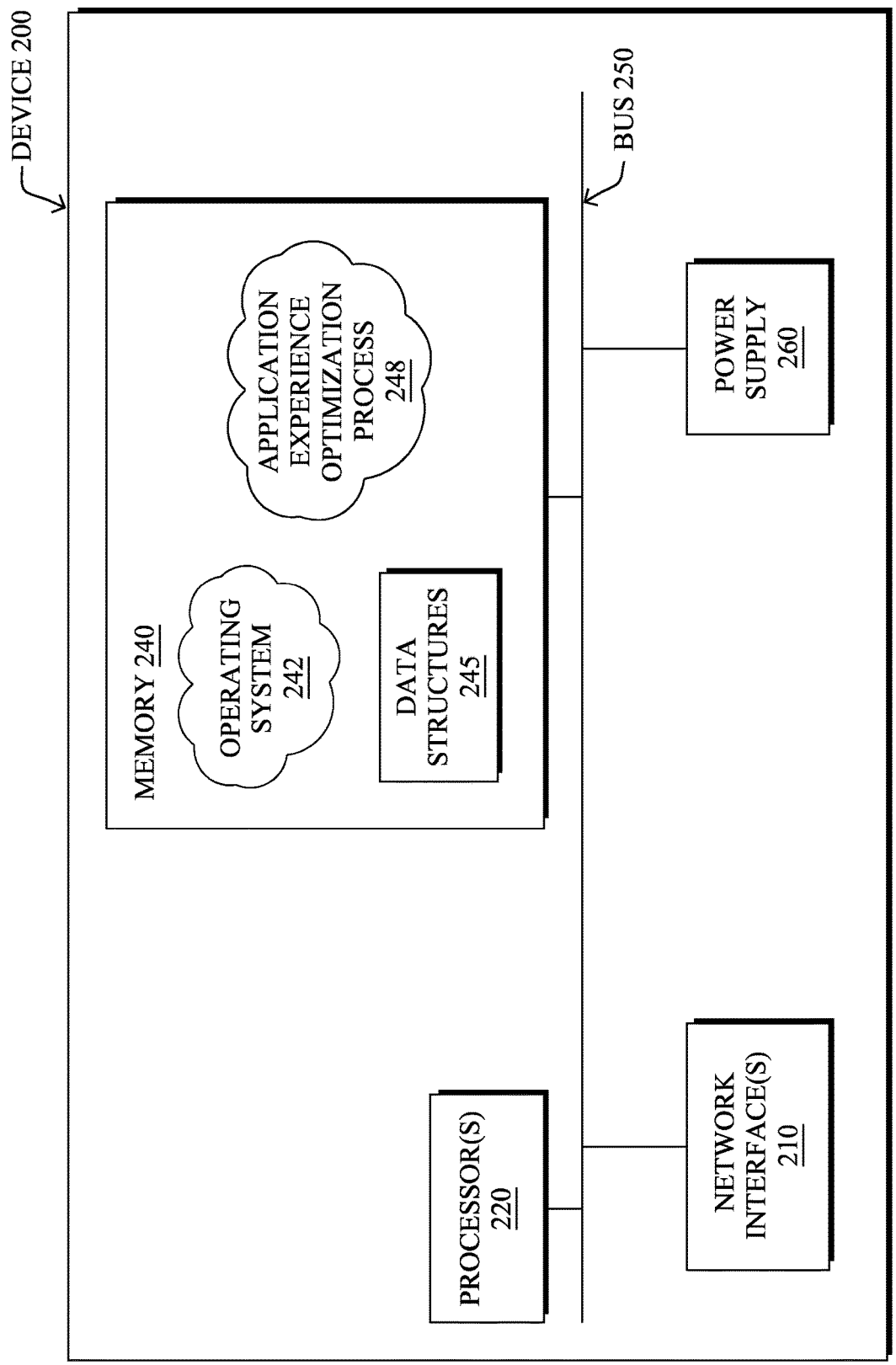
FIG. 2 illustrates an example network device/node.

FIG. 2 is a schematic block diagram of an example node/device 200 (e.g., an apparatus) that may be used with one or more embodiments described herein, e.g., as any of the computing devices shown in FIGS. 1A-1B, particularly the PE routers 120, CE routers 110, nodes/device 10-20, servers 152-154 (e.g., a network controller/supervisory service located in a data center, etc.), any other computing device that supports the operations of network 100 (e.g., switches, etc.), or any of the other devices referenced below. The device 200 may also be any other suitable type of device depending upon the type of network architecture in place, such as IoT nodes, etc. Device 200 comprises one or more network interfaces 210, one or more processors 220, and a memory 240 interconnected by a system bus 250, and is powered by a power supply 260.

The network interfaces 210 include the mechanical, electrical, and signaling circuitry for communicating data over physical links coupled to the network 100. The network interfaces may be configured to transmit and/or receive data using a variety of different communication protocols. Notably, a physical network interface 210 may also be used to implement one or more virtual network interfaces, such as for virtual private network (VPN) access, known to those skilled in the art.

The memory 240 comprises a plurality of storage locations that are addressable by the processor(s) 220 and the network interfaces 210 for storing software programs and data structures associated with the embodiments described herein. The processor 220 may comprise necessary elements or logic adapted to execute the software programs and manipulate the data structures 245. An operating system 242

(e.g., the Internetworking Operating System, or IOS®, of Cisco Systems, Inc., another operating system, etc.), portions of which are typically resident in memory 240 and executed by the processor(s), functionally organizes the node by, inter alia, invoking network operations in support of software processors and/or services executing on the device. These software processors and/or services may comprise an application experience optimization process 248, as described herein, any of which may alternatively be located within individual network interfaces.

It will be apparent to those skilled in the art that other processor and memory types, including various computer-readable media, may be used to store and execute program instructions pertaining to the techniques described herein. Also, while the description illustrates various processes, it is expressly contemplated that various processes may be embodied as modules configured to operate in accordance with the techniques herein (e.g., according to the functionality of a similar process). Further, while processes may be shown and/or described separately, those skilled in the art will appreciate that processes may be routines or modules within other processes.

In general, application experience optimization process 248 contains computer executable instructions executed by the processor 220 to perform routing functions in conjunction with one or more routing protocols. These functions may, on capable devices, be configured to manage a routing/forwarding table (a data structure 245) containing, e.g., data used to make routing/forwarding decisions. In various cases, connectivity may be discovered and known, prior to computing routes to any destination in the network, e.g., link state routing such as Open Shortest Path First (OSPF), or Intermediate-System-to-Intermediate-System (ISIS), or Optimized Link State Routing (OLSR). For instance, paths may be computed using a shortest path first (SPF) or constrained shortest path first (CSPF) approach. Conversely, neighbors may first be discovered (e.g., a priori knowledge of network topology is not known) and, in response to a needed route to a destination, send a route request into the network to determine which neighboring node may be used to reach the desired destination. Example protocols that take this approach include Ad-hoc On-demand Distance Vector (AODV), Dynamic Source Routing (DSR), DYnamic MANET On-demand Routing (DYMO), etc. Notably, on devices not capable or configured to store routing entries, application experience optimization process 248 may consist solely of providing mechanisms necessary for source routing techniques. That is, for source routing, other devices in the network can tell the less capable devices exactly where to send the packets, and the less capable devices simply forward the packets as directed.

In various embodiments, as detailed further below, application experience optimization process 248 may include computer executable instructions that, when executed by processor(s) 220, cause device 200 to perform the techniques described herein. To do so, in some embodiments, application experience optimization process 248 may utilize machine learning. In general, machine learning is concerned with the design and the development of techniques that take as input empirical data (such as network statistics and performance indicators), and recognize complex patterns in these data. One very common pattern among machine learning techniques is the use of an underlying model M, whose parameters are optimized for minimizing the cost function associated to M, given the input data. For instance, in the context of classification, the model M may be a straight line that separates the data into two classes (e.g., labels) such that $M=a*x+b*y+c$ and the cost function would be the number of misclassified points. The learning process then operates by adjusting the parameters a,b,c such that the number of misclassified points is minimal. After this optimization phase (or learning phase), the model M can be used very easily to classify new data points. Often, M is a statistical model, and the cost function is inversely proportional to the likelihood of M, given the input data.

In various embodiments, application experience optimization process 248 may employ one or more supervised, unsupervised, or semi-supervised machine learning models. Generally, supervised learning entails the use of a training set of data, as noted above, that is used to train the model to apply labels to the input data. For example, the training data may include sample telemetry that has been labeled as being indicative of an acceptable performance or unacceptable performance. On the other end of the spectrum are unsupervised techniques that do not require a training set of labels. Notably, while a supervised learning model may look for previously seen patterns that have been labeled as such, an unsupervised model may instead look to whether there are sudden changes or patterns in the behavior of the metrics. Semi-supervised learning models take a middle ground approach that uses a greatly reduced set of labeled training data.

Example machine learning techniques that application experience optimization process 248 can employ may include, but are not limited to, nearest neighbor (NN) techniques (e.g., k-NN models, replicator NN models, etc.), statistical techniques (e.g., Bayesian networks, etc.), clustering techniques (e.g., k-means, mean-shift, etc.), neural networks (e.g., reservoir networks, artificial neural networks, etc.), support vector machines (SVMs), generative adversarial networks (GANs), long short-term memory (LSTM), logistic or other regression, Markov models or chains, principal component analysis (PCA) (e.g., for linear models), singular value decomposition (SVD), multi-layer perceptron (MLP) artificial neural networks (ANNs) (e.g., for non-linear models), replicating reservoir networks (e.g., for non-linear models, typically for timeseries), random forest classification, or the like.

The performance of a machine learning model can be evaluated in a number of ways based on the number of true positives, false positives, true negatives, and/or false negatives of the model. For example, consider the case of a model that predicts whether the QoS of a path will satisfy the service level agreement (SLA) of the traffic on that path. In such a case, the false positives of the model may refer to the number of times the model incorrectly predicted that the QoS of a particular network path will not satisfy the SLA of the traffic on that path. Conversely, the false negatives of the model may refer to the number of times the model incorrectly predicted that the QoS of the path would be acceptable. True negatives and positives may refer to the number of times the model correctly predicted acceptable path performance or an SLA violation, respectively. Related to these measurements are the concepts of recall and precision. Generally, recall refers to the ratio of true positives to the sum of true positives and false negatives, which quantifies the sensitivity of the model. Similarly, precision refers to the ratio of true positives the sum of true and false positives.

As noted above, in software defined WANs (SD-WANs), traffic between individual sites are sent over tunnels. The tunnels are configured to use different switching fabrics, such as MPLS, Internet, 4G or 5G, etc. Often, the different switching fabrics provide different QoS at varied costs. For example, an MPLS fabric typically provides high QoS when compared to the Internet, but is also more expensive than traditional Internet. Some applications requiring high QoS (e.g., video conferencing, voice calls, etc.) are traditionally sent over the more costly fabrics (e.g., MPLS), while applications not needing strong guarantees are sent over cheaper fabrics, such as the Internet.

Traditionally, network policies map individual applications to Service Level Agreements (SLAs), which define the satisfactory performance metric(s) for an application, such as loss, latency, or jitter. Similarly, a tunnel is also mapped to the type of SLA that is satisfies, based on the switching fabric that it uses. During runtime, the SD-WAN edge router then maps the application traffic to an appropriate tunnel. Currently, the mapping of SLAs between applications and tunnels is performed manually by an expert, based on their experiences and/or reports on the prior performances of the applications and tunnels.

The emergence of infrastructure as a service (IaaS) and software-as-a-service (SaaS) is having a dramatic impact of the overall Internet due to the extreme virtualization of services and shift of traffic load in many large enterprises. Consequently, a branch office or a campus can trigger massive loads on the network.

Figure 3A:
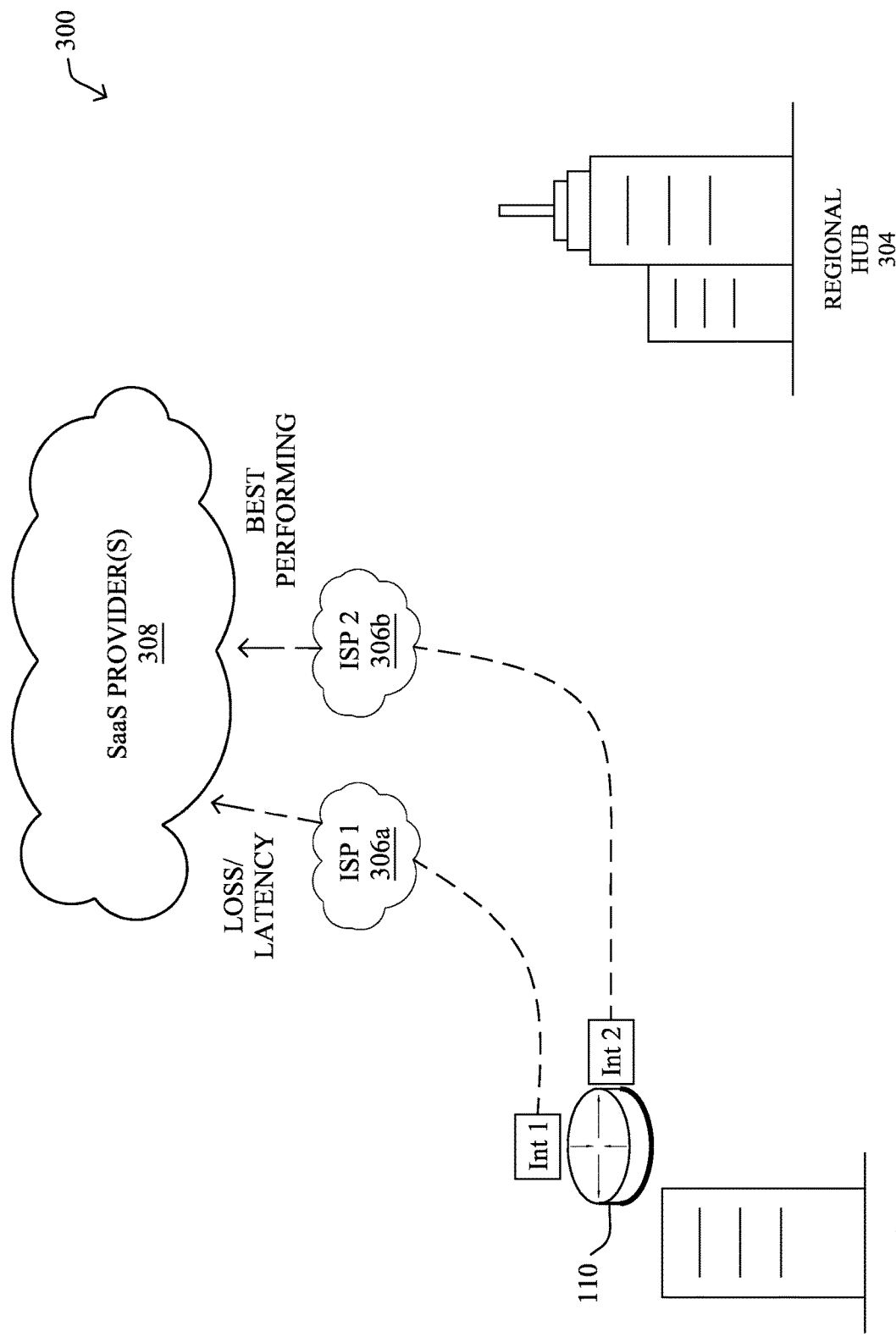
FIGS. 3A-3B illustrate example network deployments.
Figure 3B:
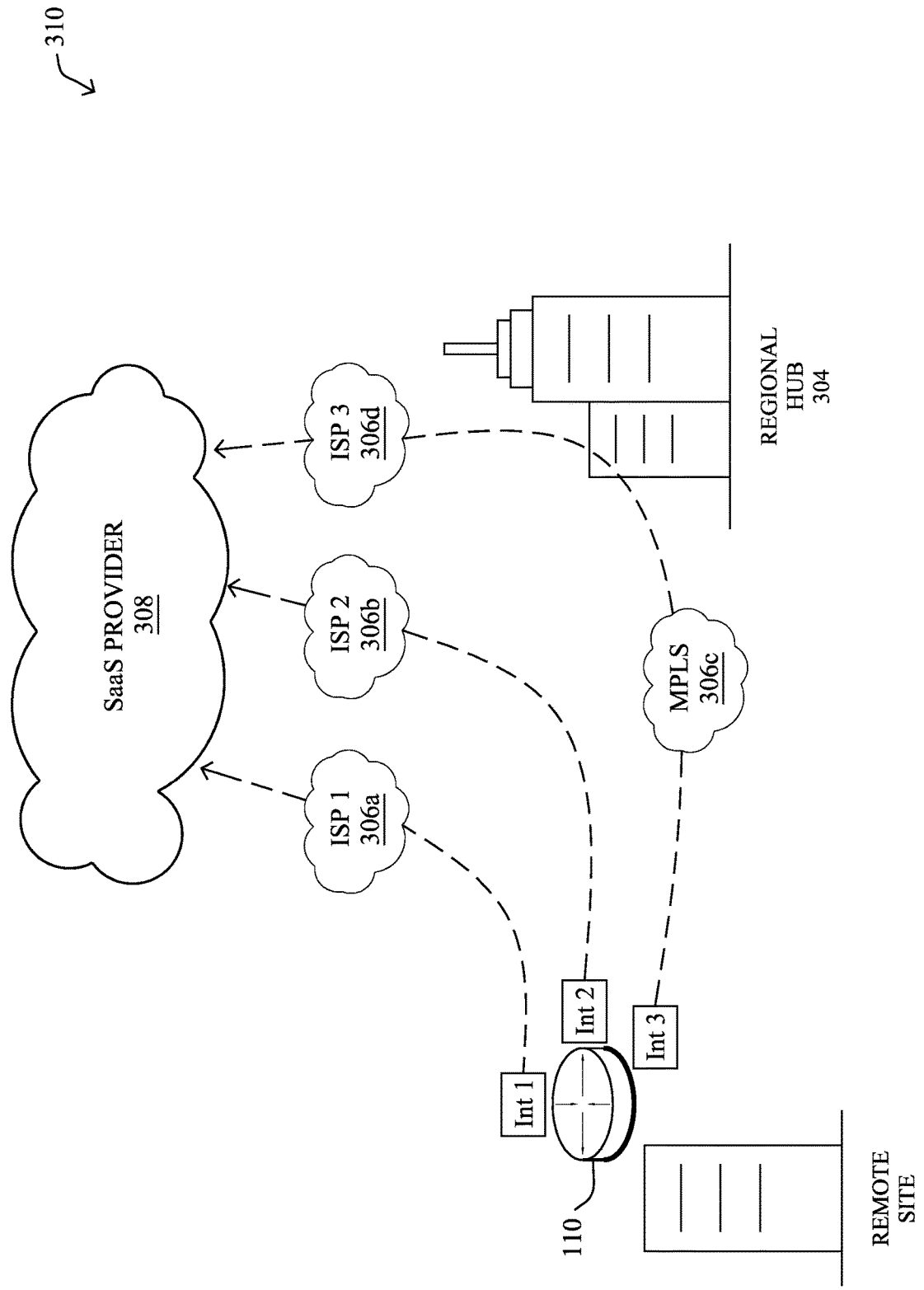

FIGS. 3A-3B illustrate example network deployments 300, 310, respectively. As shown, a router 110 located at the edge of a remote site 302 may provide connectivity between a local area network (LAN) of the remote site 302 and one or more cloud-based, SaaS providers 308. For example, in the case of an SD-WAN, router 110 may provide connectivity to SaaS provider(s) 308 via tunnels across any number of networks 306. This allows clients located in the LAN of remote site 302 to access cloud applications (e.g., Office 365™, Dropbox™, etc.) served by SaaS provider(s) 308.

As would be appreciated, SD-WANs allow for the use of a variety of different pathways between an edge device and an SaaS provider. For example, as shown in example network deployment 300 in FIG. 3A, router 110 may utilize two Direct Internet Access (DIA) connections to connect with SaaS provider(s) 308. More specifically, a first interface of router 110 (e.g., a network interface 210, described previously), Int 1, may establish a first communication path (e.g., a tunnel) with SaaS provider(s) 308 via a first Internet Service Provider (ISP) 306a, denoted ISP 1 in FIG. 3A. Likewise, a second interface of router 110, Int 2, may establish a backhaul path with SaaS provider(s) 308 via a second ISP 306b, denoted ISP 2 in FIG. 3A.

FIG. 3B illustrates another example network deployment 310 in which Int 1 of router 110 at the edge of remote site 302 establishes a first path to SaaS provider(s) 308 via ISP 1 and Int 2 establishes a second path to SaaS provider(s) 308 via a second ISP 306b. In contrast to the example in FIG. 3A, Int 3 of router 110 may establish a third path to SaaS provider(s) 308 via a private corporate network 306c (e.g., an MPLS network) to a private data center or regional hub 304 which, in turn, provides connectivity to SaaS provider(s) 308 via another network, such as a third ISP 306d.

Regardless of the specific connectivity configuration for the network, a variety of access technologies may be used (e.g., ADSL, 4G, 5G, etc.) in all cases, as well as various networking technologies (e.g., public Internet, MPLS (with or without strict SLA), etc.) to connect the LAN of remote site 302 to SaaS provider(s) 308. Other deployments scenarios are also possible, such as using Colo, accessing SaaS provider(s) 308 via Zscaler or Umbrella services, and the like.

Figure 4A:
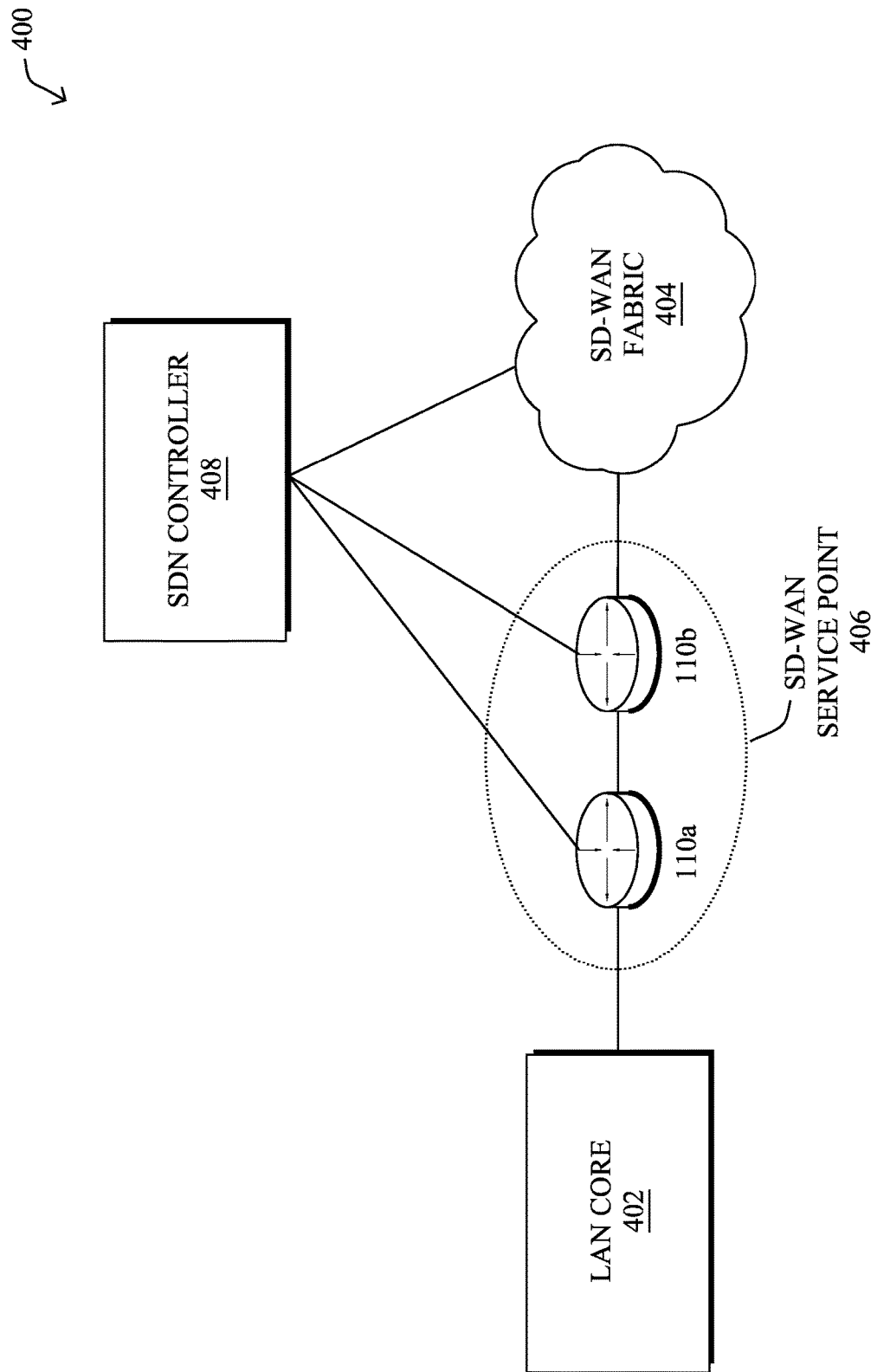
FIGS. 4A-4B illustrate example software defined network (SDN) implementations.

FIG. 4A illustrates an example SDN implementation 400, according to various embodiments. As shown, there may be a LAN core 402 at a particular location, such as remote site 302 shown previously in FIGS. 3A-3B. Connected to LAN core 402 may be one or more routers that form an SD-WAN service point 406 which provides connectivity between LAN core 402 and SD-WAN fabric 404. For instance, SD-WAN service point 406 may comprise routers 110a-110b.

Overseeing the operations of routers 110a-110b in SD-WAN service point 406 and SD-WAN fabric 404 may be an SDN controller 408. In general, SDN controller 408 may comprise one or more devices (e.g., a device 200) configured to provide a supervisory service, typically hosted in the cloud, to SD-WAN service point 406 and SD-WAN fabric 404. For instance, SDN controller 408 may be responsible for monitoring the operations thereof, promulgating policies (e.g., security policies, etc.), installing or adjusting IPsec routes/tunnels between LAN core 402 and remote destinations such as regional hub 304 and/or SaaS provider(s) 308 in FIGS. 3A-3B, and the like.

As noted above, a primary networking goal may be to design and optimize the network to satisfy the requirements of the applications that it supports. So far, though, the two worlds of "applications" and "networking" have been fairly siloed. More specifically, the network is usually designed in order to provide the best SLA in terms of performance and reliability, often supporting a variety of Class of Service (CoS), but unfortunately without a deep understanding of the actual application requirements. On the application side, the networking requirements are often poorly understood even for very common applications such as voice and video for which a variety of metrics have been developed over the past two decades, with the hope of accurately representing the Quality of Experience (QoE) from the standpoint of the users of the application.

More and more applications are moving to the cloud and many do so by leveraging an SaaS model. Consequently, the number of applications that became network-centric has grown approximately exponentially with the raise of SaaS applications, such as Office 365, ServiceNow, SAP, voice, and video, to mention a few. All of these applications rely heavily on private networks and the Internet, bringing their own level of dynamicity with adaptive and fast changing workloads. On the network side, SD-WAN provides a high degree of flexibility allowing for efficient configuration management using SDN controllers with the ability to benefit from a plethora of transport access (e.g., MPLS, Internet with supporting multiple CoS, LTE, satellite links, etc.), multiple classes of service and policies to reach private and public networks via multi-cloud SaaS.

Furthermore, the level of dynamicity observed in today's network has never been so high. Millions of paths across thousands of Service Provides (SPs) and a number of SaaS applications have shown that the overall QoS(s) of the network in terms of delay, packet loss, jitter, etc. drastically vary with the region, SP, access type, as well as over time with high granularity. The immediate consequence is that the environment is highly dynamic due to:

New in-house applications being deployed;
New SaaS applications being deployed everywhere in the network, hosted by a number of different cloud providers;
Internet, MPLS, LTE transports providing highly varying performance characteristics, across time and regions;
SaaS applications themselves being highly dynamic: it is common to see new servers deployed in the network. DNS resolution allows the network for being informed of a new server deployed in the network leading to a new destination and a potentially shift of traffic towards a new destination without being even noticed.

According to various embodiments, application aware routing usually refers to the ability to rout traffic so as to satisfy the requirements of the application, as opposed to exclusively relying on the (constrained) shortest path to reach a destination IP address. Various attempts have been made to extend the notion of routing, CSPF, link state routing protocols (ISIS, OSPF, etc.) using various metrics (e.g., Multi-topology Routing) where each metric would reflect a different path attribute (e.g., delay, loss, latency, etc.), but each time with a static metric. At best, current approaches rely on SLA templates specifying the application requirements so as for a given path (e.g., a tunnel) to be "eligible" to carry traffic for the application. In turn, application SLAs are checked using regular probing. Other solutions compute a metric reflecting a particular network characteristic (e.g., delay, throughput, etc.) and then selecting the supposed 'best path,' according to the metric.

The term 'SLA failure' refers to a situation in which the SLA for a given application, often expressed as a function of delay, loss, or jitter, is not satisfied by the current network path for the traffic of a given application. This leads to poor QoE from the standpoint of the users of the application. Modern SaaS solutions like Viptela, CloudonRamp SaaS, and the like, allow for the computation of per application QoE by sending HyperText Transfer Protocol (HTTP) probes along various paths from a branch office and then route the application's traffic along a path having the best QoE for the application. At a first sight, such an approach may solve many problems. Unfortunately, though, there are several shortcomings to this approach:

The SLA for the application is 'guessed,' using static thresholds.
Routing is still entirely reactive: decisions are made using probes that reflect the status of a path at a given time, in contrast with the notion of an informed decision.
SLA failures are very common in the Internet and a good proportion of them could be avoided (e.g., using an alternate path), if predicted in advance.

Figure 4B:
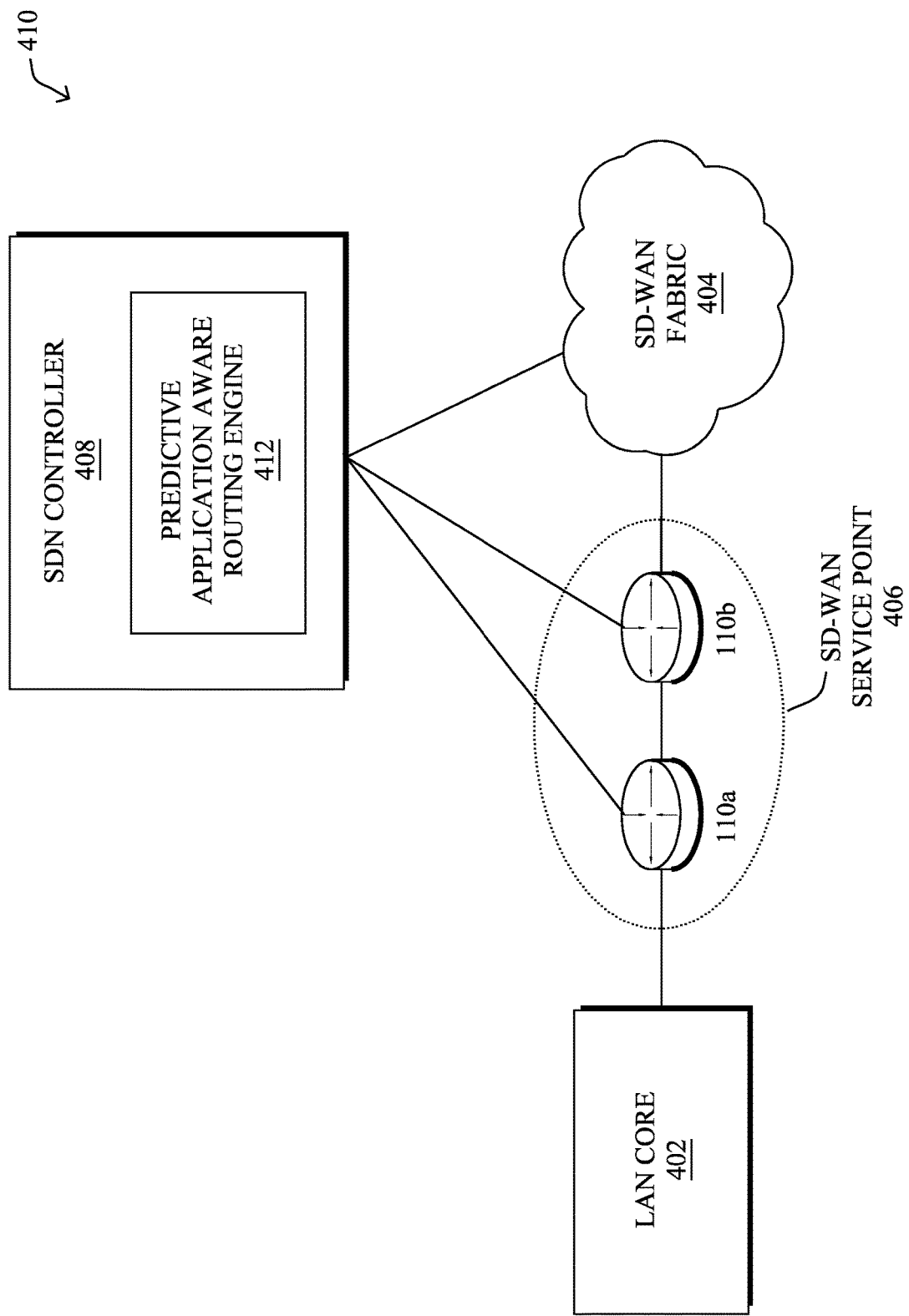

In various embodiments, the techniques herein allow for a predictive application aware routing engine to be deployed, such as in the cloud, to control routing decisions in a network. For instance, the predictive application aware routing engine may be implemented as part of an SDN controller (e.g., SDN controller 408) or other supervisory service, or may operate in conjunction therewith. For instance, FIG. 4B illustrates an example 410 in which SDN controller 408 includes a predictive application aware routing engine 412 (e.g., through execution of application experience optimization process 248). Further embodiments provide for predictive application aware routing engine 412 to be hosted on a router 110 or at any other location in the network.

During execution, predictive application aware routing engine 412 makes use of a high volume of network and application telemetry (e.g., from routers 110a-110b, SD-WAN fabric 404, etc.) so as to compute statistical and/or machine learning models to control the network with the objective of optimizing the application experience and reducing potential down times. To that end, predictive application aware routing engine 412 may compute a variety of models to understand application requirements, and predictably route traffic over private networks and/or the Internet, thus optimizing the application experience while drastically reducing SLA failures and downtimes.

In other words, predictive application aware routing engine 412 may first predict SLA violations in the network that could affect the QoE of an application (e.g. due to spikes of packet loss or delay, sudden decreases in bandwidth, etc.). In other words, predictive application aware routing engine 412 may use SLA violations as a proxy for actual QoE information (e.g. ratings by users of an online application regarding their perception of the application), unless such QoE information is available from the provider of the online application. In turn, predictive application aware routing engine 412 may then implement a corrective measure, such as rerouting the traffic of the application, prior to the predicted SLA violation. For instance, in the case of video applications, it now becomes possible to maximize throughput at any given time, which is of utmost importance to maximize the QoE of the video application. Optimized throughput can then be used as a service triggering the routing decision for specific application requiring highest throughput, in one embodiment. In general, routing configuration changes are also referred to herein as routing "patches," which are typically temporary in nature (e.g., active for a specified period of time) and may also be application-specific (e.g., for traffic of one or more specified applications).

As noted above, application-aware predictive routing systems, such as predictive application aware routing engine 412, are able to avoid degraded application experience by forecasting the possible degradation and switching the application traffic to another network path that should provide a better application experience. This is in contrast to reactive routing approaches that only take corrective measures after the application experience is already degraded. Such periods of degraded application experience (i.e., the user experience in the application is considered unacceptable) are generally referred to herein as 'application failures.'

It is important to note that application failures do not, in most cases, have a ground truth and there is no one simple way to define an application failure. Indeed, network metrics such as loss, latency, and jitter could be used as a proxy for the application experience. For example, a voice application may be considered to give poor user experience when it violates an SLA such as: latency>300 ms or loss>3% or jitter>50 ms. Of course, other metrics, such as real application feedback (e.g., Mean Opinion Scores for voice), could also be used.

The output of a prediction model, such as one used by predictive application aware routing engine 412, is also often given in terms of a probability, rather than as a binary decision (i.e., 'acceptable' or 'unacceptable'). For instance, predictive application aware routing engine 412 may compute the probability of an SLA violation (probSLAViolation) and use this as a proxy for the application experience. This means that what is considered to be an application failure in terms of this probability over time can also vary and is largely subjective from the standpoint of a network administrator.

For instance, an application failure event may be defined when the probability of an SLA violation jumps from, say, less than 2% to greater than 10% in 1 hour. However, depending on the network and application, the probability of an SLA violation may gradually go from 2% to 10% over a relatively long period of time (e.g., over the course of hours) or even quickly spike over a very short period of time (e.g., on the order of a few seconds or minutes).

Thus, the definition of what actually qualifies as an application failure for purposes of making proactive routing decisions is largely subjective from the standpoint of a network expert/administrator.

Auto-Detection of Application Failures for
Forecasting Network Path Performance

The techniques introduced herein support application-aware predictive routing systems by allowing a network administrator to define what they consider to be application failure events. In further aspects, the techniques herein also allow such an administrator to specify metrics that can be used for measuring the effectiveness of the 5 predictive routing protocols in forecasting application failure events before they occur.

Illustratively, the techniques described herein may be performed by hardware, software, and/or firmware, such as in application experience optimization process 248, which may include computer executable instructions executed by the processor 220 (or independent processor of interfaces 210) to perform functions relating to the techniques described herein.

Specifically, according to various embodiments, a device provides, to a user interface, a timeseries for display of a probability over time of a network path violating a service level agreement (SLA) associated with an online application. The device receives, from the user interface, a plurality of thresholds for the timeseries that define periods of time during which application experience of the online application is believed to be degraded. The device trains, based on the plurality of thresholds, a machine learning model to predict when the application experience of the online application will be degraded. The device causes a predictive routing engine to reroute traffic of the online application based on a prediction by the machine learning model that the application experience of the online application will be degraded.

Operationally, a first aspect of the techniques herein allows a network administrator or other expert to define what is considered to be an application failure, in various embodiments. For instance, one network administrator may believe that an application failure for a particular application corresponds to a jump in the probability of an SLA violation from M % to N % over the course of K-number of hours, while another network administrator may believe that an application failure exists when the probability increases from X % to Y % over Z-number of hours. In addition, how to quantify the performance of the prediction model is also largely subjective. Accordingly, the techniques herein introduce mechanisms that allow a network administrator to tune the operation of an application-aware predictive routing system until its performance is considered acceptable to the network administrator.

Figure 5:
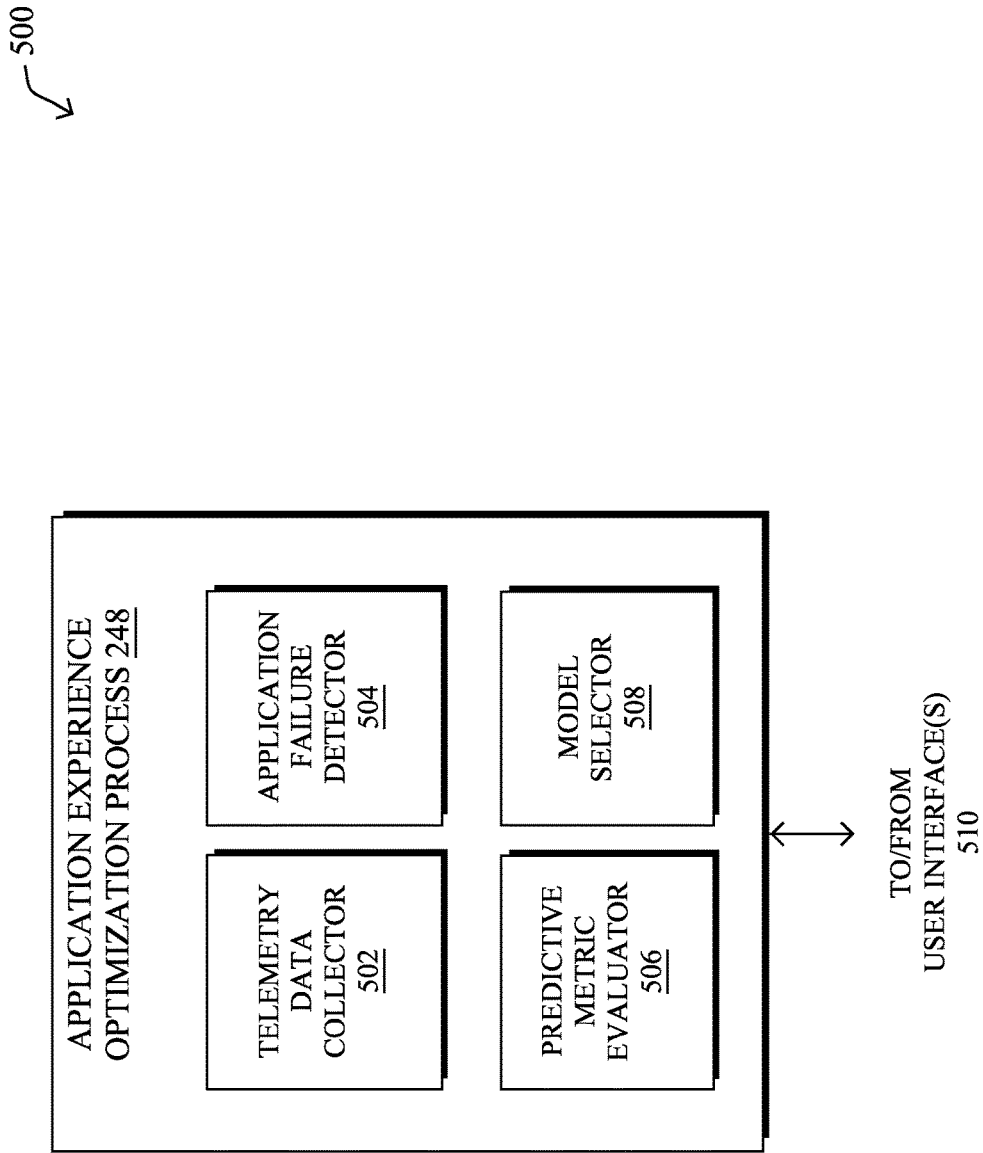
FIG. 5 illustrates an example architecture for the automatic detection of application failures for forecasting network path performance.

FIG. 5 illustrates an example architecture 500 for the automatic detection of application failures for forecasting network path performance, according to various embodiments. At the core of architecture 500 is application experience optimization process 248, which may be executed by a controller for a network, a networking device, or another device in communication therewith. For instance, application experience optimization process 248 may be executed by a controller for a network (e.g., SDN controller 408 in FIGS. 4A-4B), a particular networking device in the network (e.g., a router, etc.), another device or service in communication therewith, or the like. In some embodiments, for instance, application experience optimization process 248 may be used to implement a predictive application aware routing engine, such as predictive application aware routing engine 412, or another supervisory service for the network. In other embodiments, application experience optimization process 248 may be used to implement a reactive routing approach in the network.

As shown, application experience optimization process 248 may include any or all of the following components: a telemetry data collector 502, an application failure detector 504, a predictive metric evaluator 506, and/or a model selector 508. As would be appreciated, the functionalities of these components may be combined or omitted, as desired (e.g., implemented as part of application experience optimization process 248). In addition, these components may be implemented on a singular device or in a distributed manner, in which case the combination of executing devices can be viewed as their own singular device for purposes of executing application experience optimization process 248.

During operation, telemetry data collector 502 may be configured to obtain various telemetry data regarding the paths in a network, such as their QoS or other path metrics. In various embodiments, telemetry data collector 502 may obtain such information from a datalake (e.g., a datalake on which application experience optimization process 248 operates), from various telemetry sources in the network (e.g., routers, switches, etc.) or may collect such information, directly. For instance, telemetry data collector 502 may collect path telemetry data for a path regarding measured metrics such as loss, latency, jitter, etc., at a given frequency Fi for a period of time Ti along each path of interest Pi. This can be done either on a pull basis by sending a request to one or more networking devices for the telemetry data or on a push basis, where the telemetry data is sent to telemetry data collector 502, automatically. In one embodiment, telemetry could be gathered by telemetry data collector 502 using time based telemetry (streaming). In another embodiment, a (more exhaustive) data gathering campaign may be triggered by telemetry data collector 502 to gather a rich set of telemetry variables to a collection of routers in the network.

In yet another embodiment, the techniques herein may be limited to a specific set of paths (paths carrying a given set of (critical) applications, a high volume of traffic, etc.), as configured by a user. In addition, another function of telemetry data collector 502 may be to compute timeseries from the received path metrics for the various network paths.

If available, telemetry data collector 502 may also obtain telemetry data indicative of user satisfaction scores for a given online application whose traffic is routed via a particular path. For instance, the online application itself may include a mechanism that allows users to rate their satisfaction with the performance of the online application (e.g., rating a videoconference on a scale of 0-5 stars, etc.). In other instances, user satisfaction information can be captured through agents, polling mechanisms (e.g., email, text, etc.), or the like. Regardless, telemetry data collector 502 may access this information via an application programming interface (API) associated with the system responsible for capturing or reporting such information. Telemetry collector 502 may further obtain configuration or other information for the various paths, such as their SLA templates, their path types (e.g., business Internet, MPLS, public Internet, etc.), geographic information, service provider information, etc. In yet other embodiments, the timeseries may take the form of categorical values, such as labeling the path metric as "good," "bad," etc. every n-number of minutes.

Thus, telemetry data collector 502 may be used to collect and store sets of path performance metrics such as delay, loss, jitter, transaction times, etc., potentially on a per-path and/or per-application basis.

In various embodiments, application failure detector 504 may be responsible for interacting with a user, such as a network administrator, to define and refine what is considered to be an application failure. In one embodiment, application failure detector 504 may do so by first computing a timeseries from which application failures can be inferred for a particular application, such as a probability of an SLA violation by a network path (ProbSLAViolation). In turn, application failure detector 504 may provide the timeseries for display by one or more user interface(s) 510 for review.

In some embodiments, application failure detector 504 may also receive, from the user interface(s) 510, a definition of an application failure from a network administrator or other user. For instance, based on the displayed timeseries information, the user may specify any or all of the following thresholds, to define what is believed to be an application failure:

A lower threshold for the timeseries metric
An upper threshold for the timeseries metric
A duration of time threshold for an application failure event Thus, in some cases, application failure detector 504 may receive a tuple that defines an application failure as follows: <application, lower-probSLAViolation threshold, upper-probSLAViolation threshold, time-duration>. In such instances, the lower- and upper-probSLAViolation are the lower and upper bounds for the probSLAViolation to jump, and time-duration specifies the amount of time within which the probSLAViolation needs to jump between the lower and upper-thresholds. For example, the expert may enter <voice, 2%, 10%, 10-mins> for the definition. Then, if the probSLAViolation for a voice application jumps from 1% to 15% (below than the lower-bound to above upper-bound), an application failure will be marked.

Based on a definition of an application failure from user interface(s) 510, application failure detector 504 may then identify conditions that satisfy this definition on any or all paths that convey traffic for that application. In turn, application failure detector 504 may also provide statistics regarding these application failures for display by user interface(s) 510. Doing so allows the network administrator to revise the definition, as they deem appropriate, and review the effects.

In an advanced embodiment, application failure detector 504 may also choose tunnels or other paths where peaks in the timeseries occur, but sufficient application failures were not detected. To do this, application failure detector 504 may leverage a peak detector (e.g., the scipy.signal.find_peaks function in Python, etc.), to detect peaks in the probability timeseries of an SLA violation. In turn, application failure detector 504 may correlate the number of peaks to the number of application failures detected from the specified definition. In turn, application failure detector 504 may return information to user interface(s) 510 indicating where application failures were detected for each peak versus paths where the number of detected application failures were far fewer than the number of peaks detected in the timeseries.

Figure 6A:
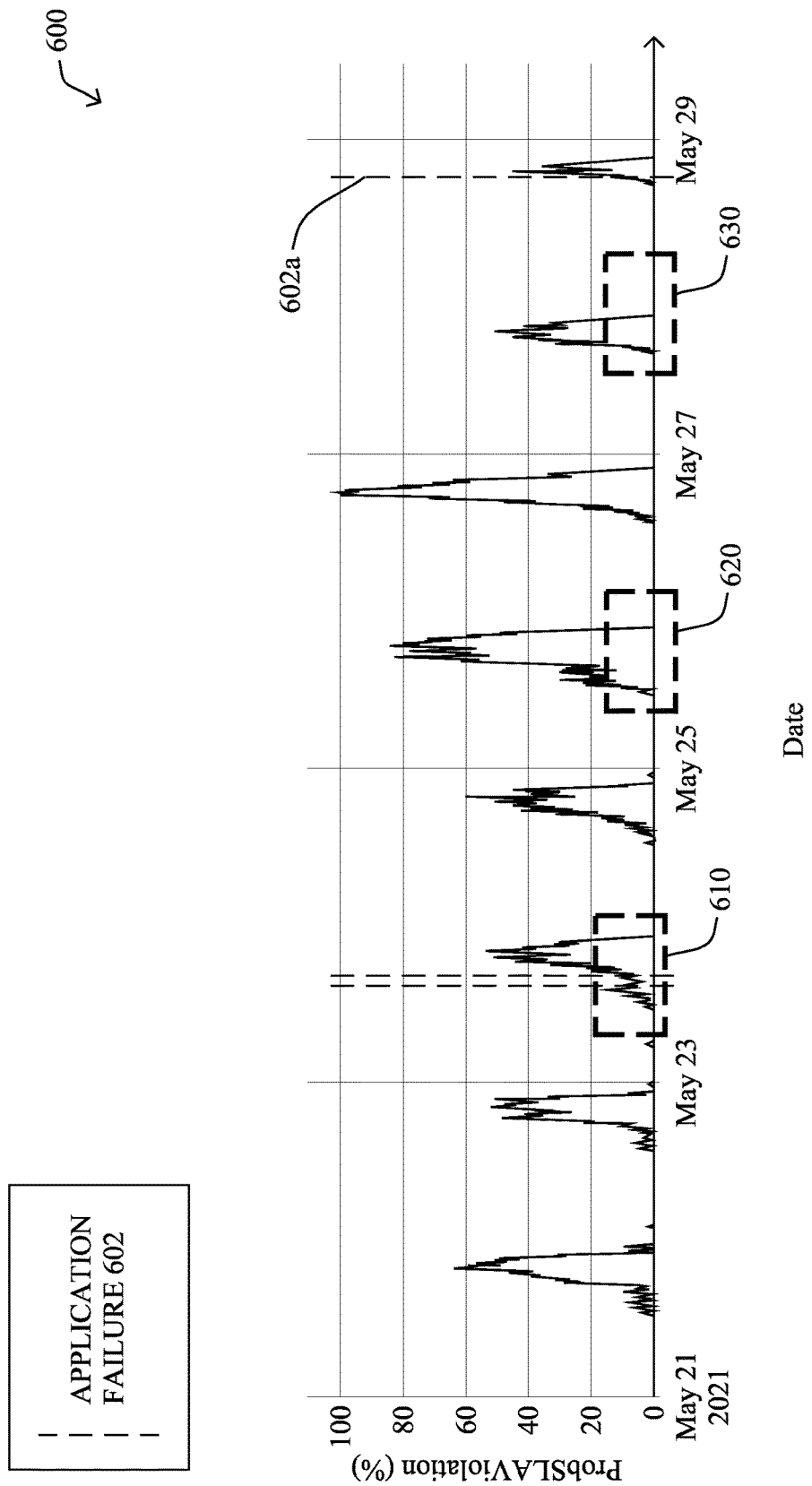
FIGS. 6A-6D illustrate example timeseries plots of a probability of a path violating a service level agreement (SLA)

For instance, FIGS. 6A-6D illustrate example timeseries plots of a probability of a path violating an SLA. More specifically, FIG. 6A illustrates an example timeseries plot of the ProbSLAViolation (%) computed by application failure detector 504 over time for a given path/tunnel, from which telemetry data is sampled every ten minutes. As can be seen, the timeseries exhibits fifteen peaks in fifteen days, but the specified rule only identified five application failures 602, such as application failure 602a, which are denoted by dashed vertical lines.

Here, assume that the network administrator has defined an application failure as occurring when probSLAV(t−10m) <2% and probSLAV(t)≥10%. In other words, the application experience of the application is believed to be degraded when the probability of the path violating the SLA of the application jumps within a ten minute interval from less than 2% to greater than or equal to 10%. With such a definition, only five of the fifteen peaks in the timeseries are actually identified as representing application failures. This is in spite of the probSLAViolation timeseries seasonally going from approximately 0% to approximately 40%.

Figure 6B:
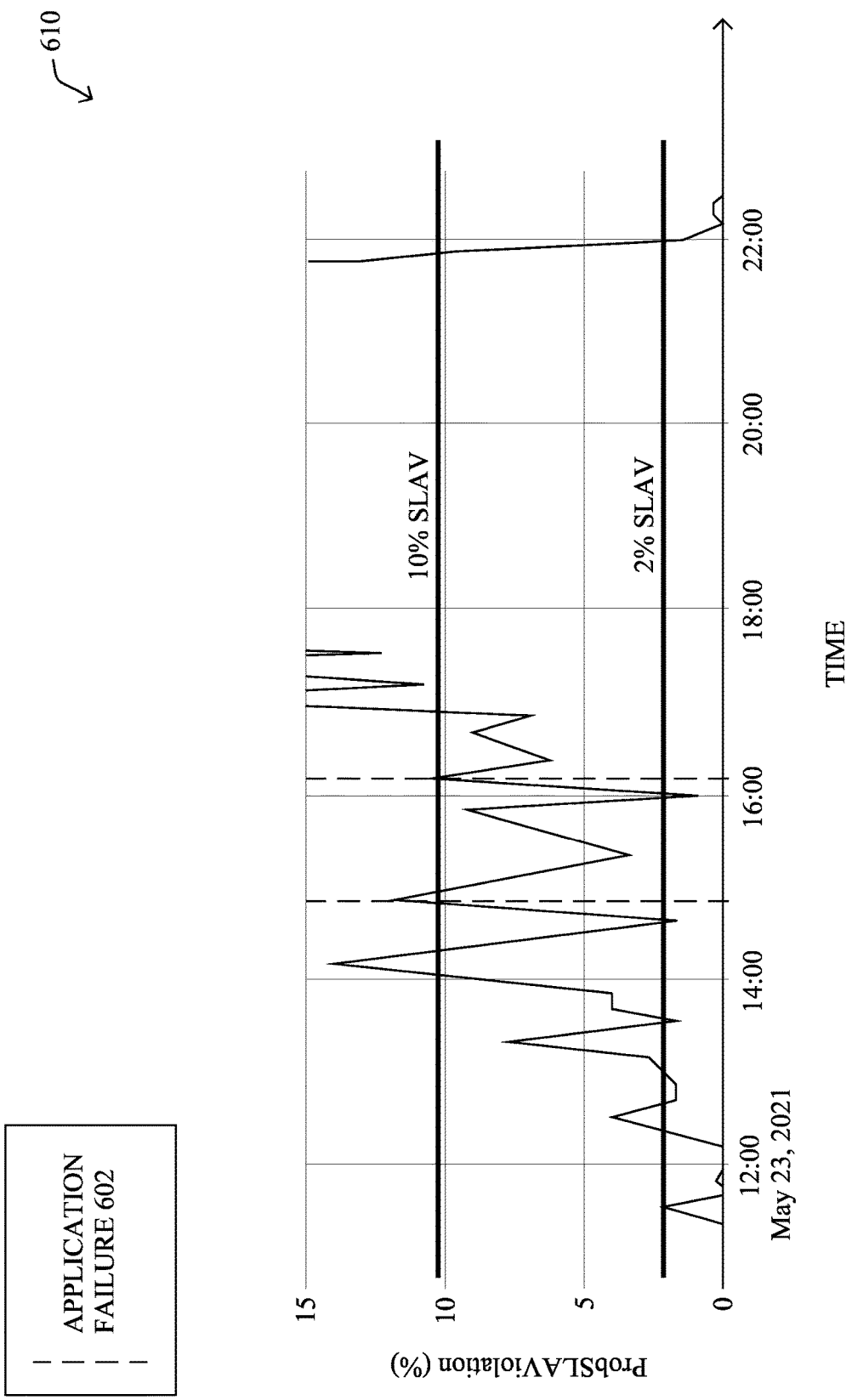
Figure 6C:
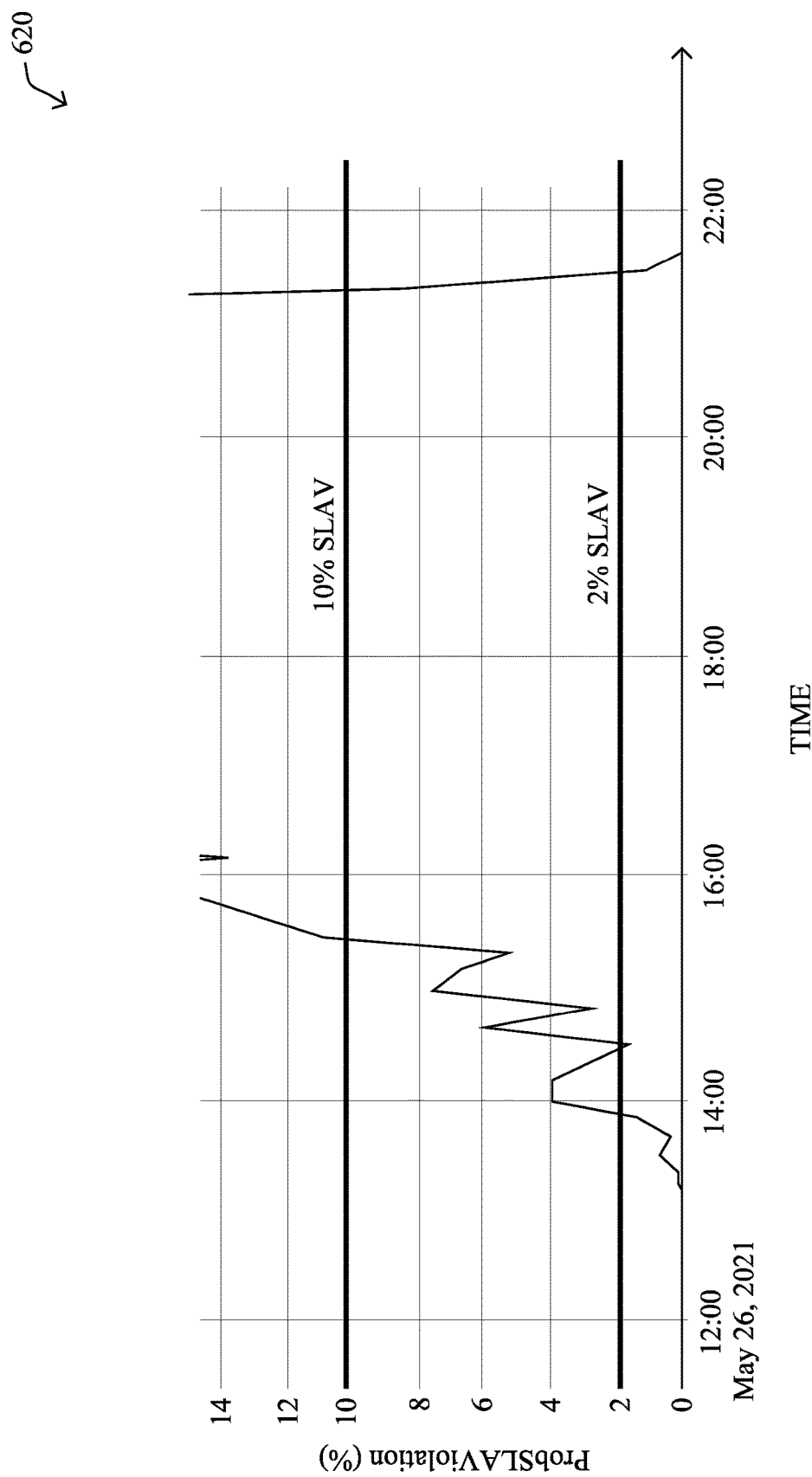
Figure 6D:
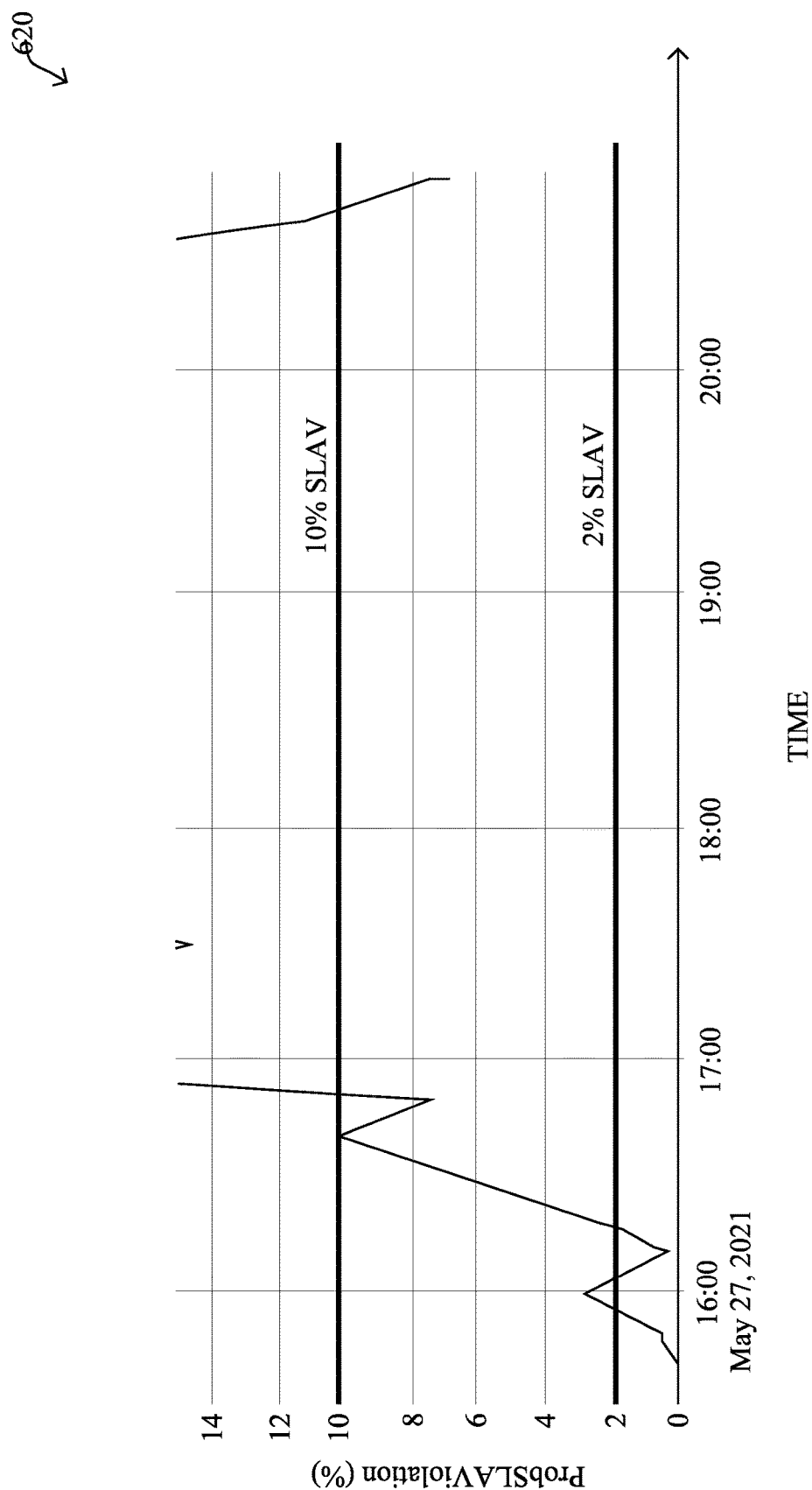

Portions 610-630 of plot 600 represent different cases in which application failures are detected and not detected, based on the above definition. For instance, FIG. 6B shows portion 610 in more detail. As shown, during this portion of the timeseries, two application failures 602 were detected that satisfy the above definition, as both corresponded to very rapid and sharp jumps in the probSLAV. In FIGS. 6C-6D, however, no application failures 602 were detected in portions 620, 630, respectively, even though the probSLAViolation value gradually rose from <2% to ≥10% in both cases (e.g., sometimes within a time period of two hours).

Referring again to FIG. 5, application failure detector 504 may also provide to user interface(s) 510 for display the predictability of an application failure being detected. For example, in the case of FIGS. 6A-6D, application failure detector 504 may estimate that the network path experiences application failures or seasonal peaks in the probSLAViolation at predictable interfaces. In turn, application failure detector 504 may provide an indication of this predictability to user interface(s) 510 for display. As would be appreciated, lower predictability in this instance could be more disruptive in nature and have a higher impact, compared to an application failure that is expected by the forecasting system.

Thus, one function of application failure detector 504 may be to provide enough information to user interface(s) 510 such that a network administrator can define and redefine what is considered an application failure. For instance, in the case of FIGS. 6A-6D, they may recognize that most times the probSLAViolation does not jump from 2% to 10% in 10-minute intervals, but would take an hour to jump between those values. Based on such insights, the network administrator may change the rule definition for an application failure to, say, <voice, 2%, 10%, 1-hour>. Doing so allows the expert to iteratively mark the desired application failure points. In turn, such application failures will be used by the resulting prediction models during both their training and inference stages.

In some embodiments, application failure detector 504 may also provide QoE metrics obtained by telemetry data collector 502 to user interface(s) 510 for display, as well. Doing so would further allow the network administrator to identify when precisely application failures were actually experienced. For instance, such information may include a measurement of the application experience computed by the application itself, such as a mean opinion score (MOS) value, a metric based on user feedback ratings, or the like.

In various embodiments, predictive metric evaluator 506 may be responsible for setting rules that specify when an application failure is detected by a predictive model before it occurs, and the resulting performance of the corresponding models (e.g., in terms of their precision, recall, etc.). For instance, assume that application experience optimization process 248 trains a model to predict probSLAViolation using a timeseries-based regression forecasting approach, such as AutoRegressive Integrated Moving Average (ARIMA), Holt-Winters, or Long short-term memory (LSTM) models. When such models are being used, the output is usually the probSLAViolation at future times (e.g., in the next 1 hour). However, the main issue here is that many prediction/forecasting approaches are prone to "follow" the past in many noisy timeseries. Testing has revealed that a probSLAViolation timeseries often exhibits such behavior. In order to compare multiple models and choose the best model for application-aware predictive routing, it is important to see which model predicts an application failure event before it occurs versus another model that might just follow. Note that any reactive protocol can follow what just happened in the past and, hence, it is important to choose a model that can predict an application failure before one occurs.

In various embodiments, based on the application failure definition from application failure detector 504, predictive metric evaluator 506 may determine performance metrics on which the predictive model is to be evaluated. For instance, predictive metric evaluator 506 may interact with user interface(s) 510 to define what it means for there to be a true positive, false negative, false positive, or the like, or define such performance metrics, automatically.

Figures 7A, 7B:
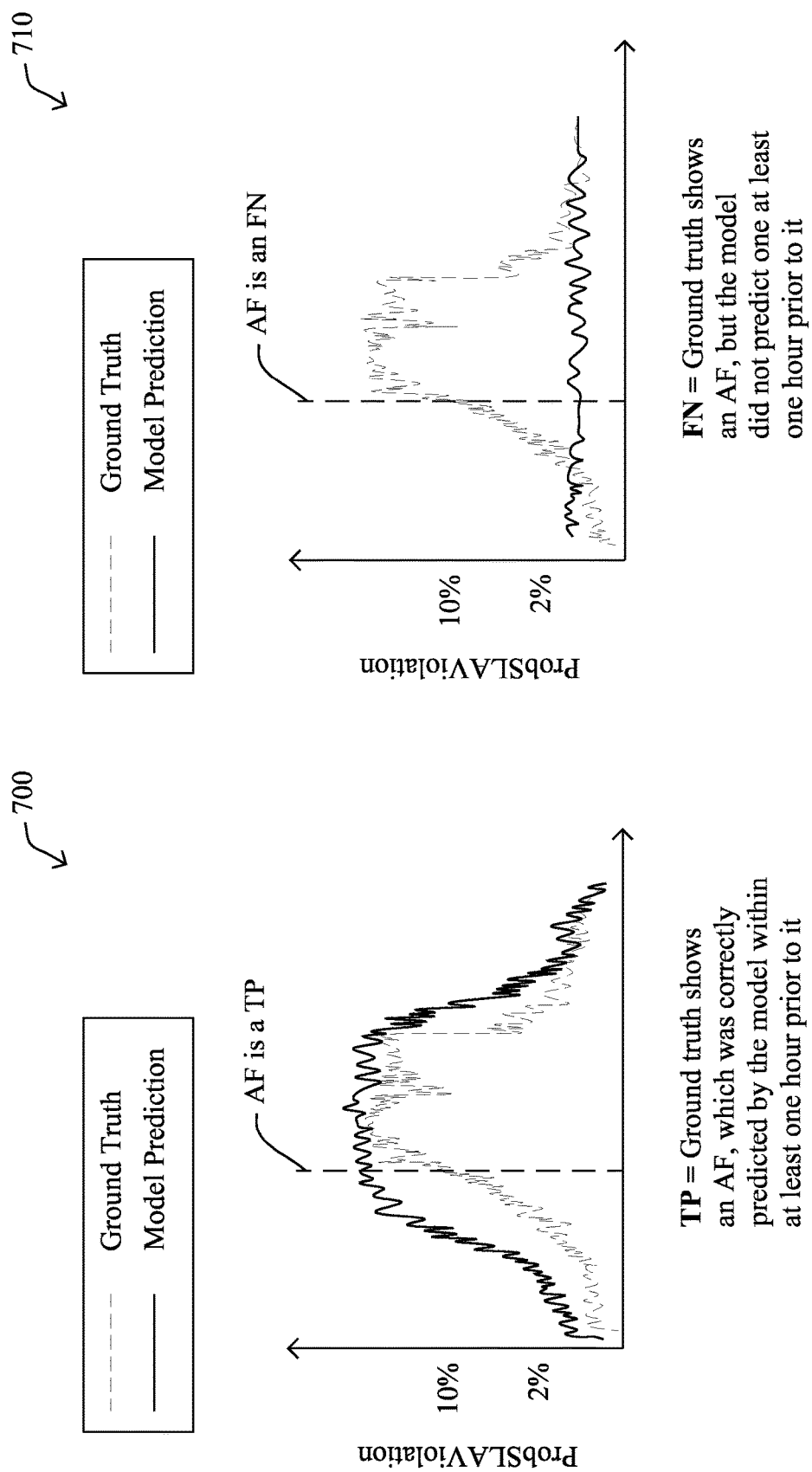
FIGS. 7A-7C illustrate example plots of different performance metrics for a prediction model.
Figure 7C:
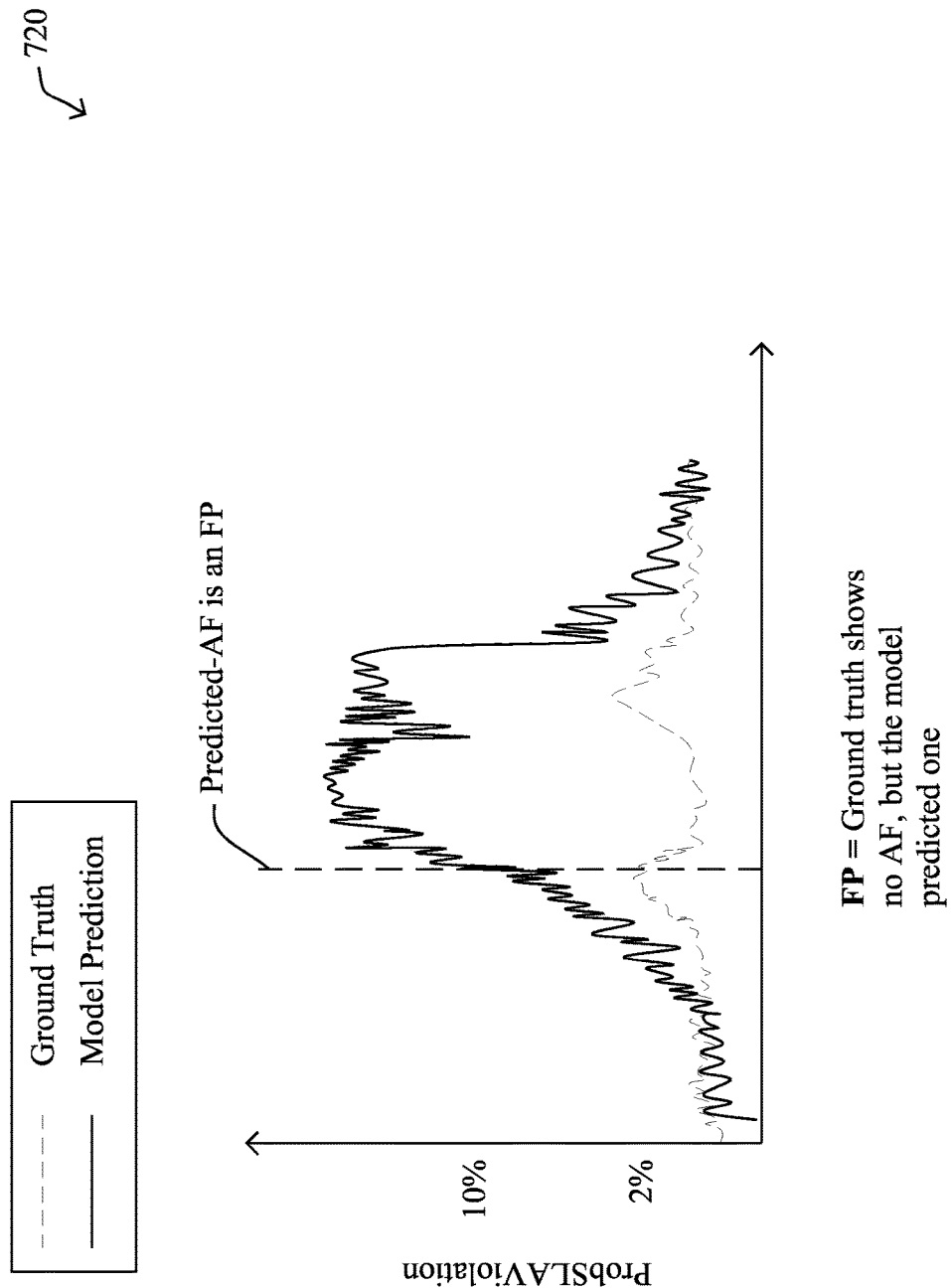

FIGS. 7A-7C illustrate example plots of different performance metrics for a prediction model, in various embodiments. More specifically, FIG. 7A illustrates a plot 700 showing one potential example of a true positive (TP) by the prediction model. Here, assume that a ground truth is available with respect to the predicted probSLAViolation, meaning that the model was successfully able to predict an application failure (e.g., an increase of more than 10% in the probSLAViolation) at least one hour in advance of the actual application failure (denoted 'AF' in FIGS. 7A-7C). Here, the 10% threshold, as well as the 1 hour, may be parameters that an expert may be able to tune via user interface(s) 510, to define what constitutes a true positive.

FIG. 7B illustrates a plot 710 showing one potential example of a false negative (FN). Here, the ground truth indicates that there was an application failure, but the prediction model was not able to predict it in the last hour. Similar to the true positive definition, the threshold probSLAViolation, as well as the amount of time before predictions by the prediction model should come true, may be configurable parameters for purposes of defining a false negative.

FIG. 7C illustrates a plot 720 showing one potential example of a false positive (FP). Here, the model predicted an application failure within the next hour, but the ground truth reveals that no such application failure actually occurred. As with the other model performance metrics above, the thresholds used to define false positives can also be configurable.

Referring again to FIG. 5, in advanced embodiments, predictive metric evaluator 506 may also use a peak detector on both the ground truth and predicted probSLAViolation timeseries, and then detect how much time before the peaks is seen in the predicted application failures than in the ground truth. For example, predictive metric evaluator 506 may determine that most application failures are detected at 2 hours before they actually occur, but not one hour before. Such insights can be provided for display via user interface(s) 510, to help the expert to tune the definitions of a true positive, false positive, false negative, etc.

Figure 8A:
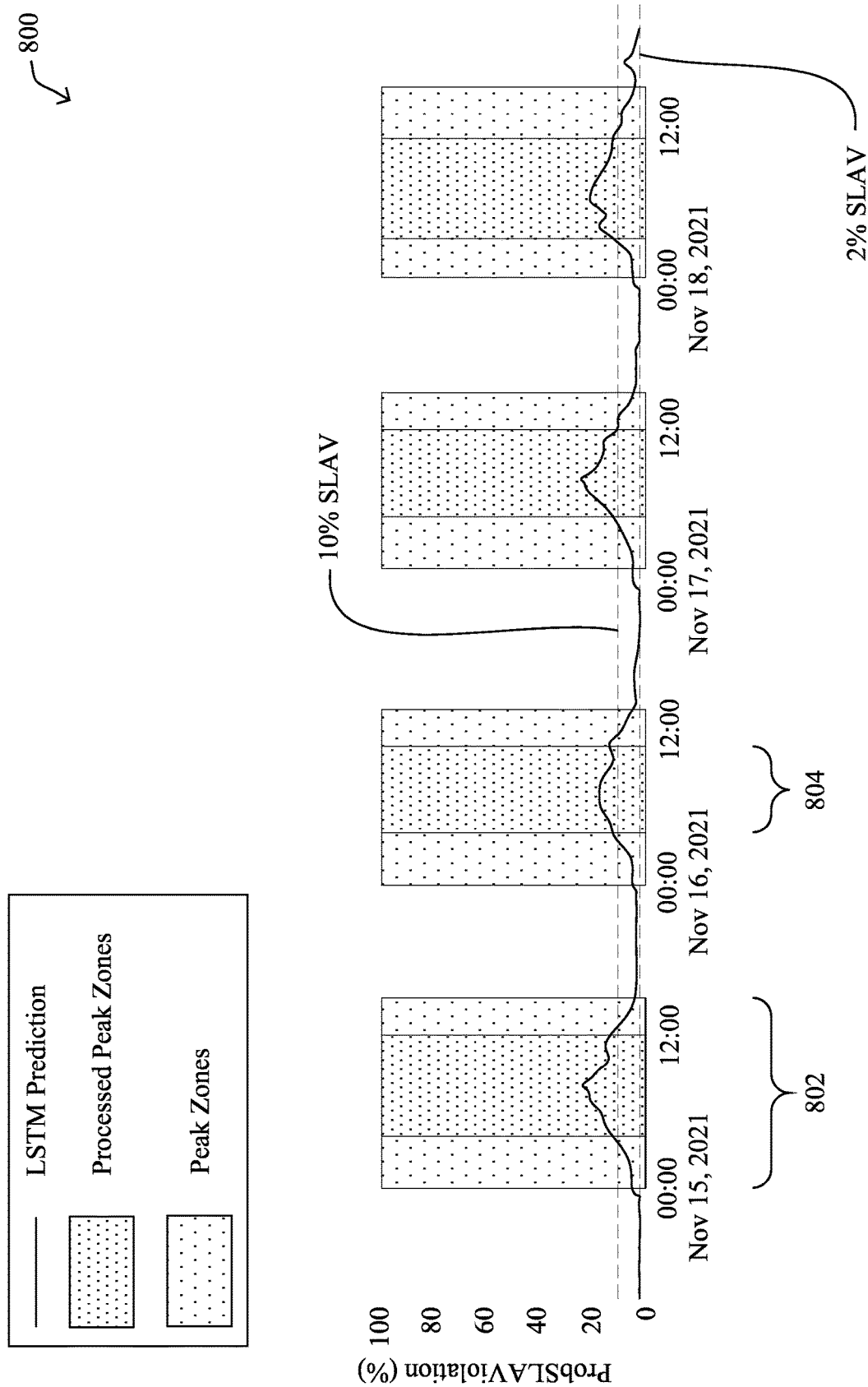
FIGS. 8A-8B illustrate example plots demonstrating the use of a peak detector on a timeseries to define true positives.
Figure 8B:
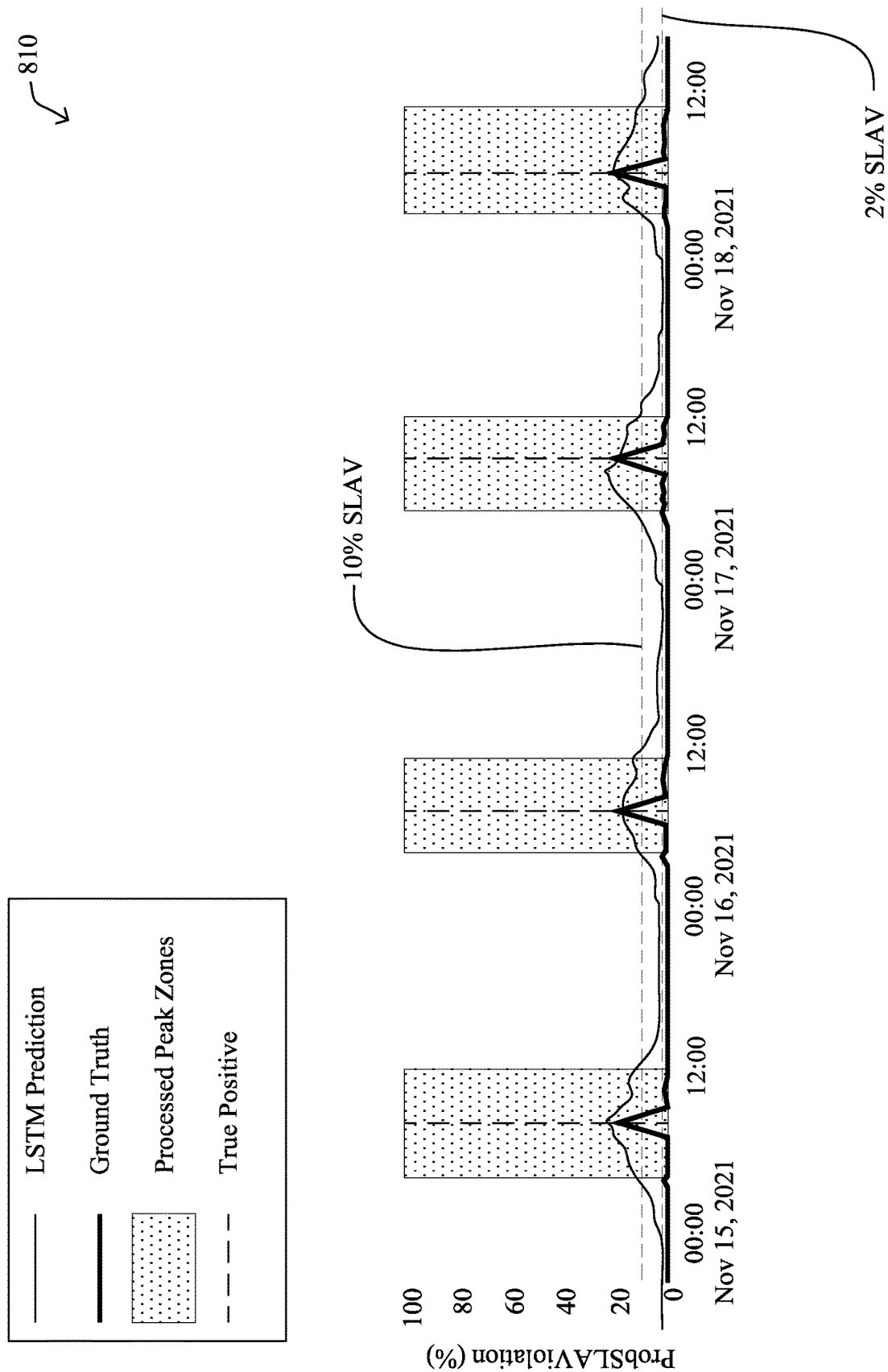

FIGS. 8A-8B illustrate example plots demonstrating the use of a peak detector on a timeseries to define true positives, in various embodiments. More specifically, FIG. 8A shows a timeseries plot 800 of the probSLAViolation predicted by an LSTM-based prediction model. Application of a peak detection algorithm to this timeseries may label the peak zones as follows: the peak height should be at least 10% and the peak width should be at least three hours. In turn, the peak detector may return the left and right indices of any detected peak. For instance, range 802 represents one potential peak zone from the algorithm and range 804 represents one potential peak zone that is actually processed for purposes of evaluating whether there was a true positive by the prediction model.

FIG. 8B shows an example 810 of plot 800 overlaid with the ground truth. Here, predictive metric evaluator 506 may check within the selected peak zones to check whether an application failure actually occurred within them or not, and use this analysis to tag the predictions as true positives, false positives, false negatives, etc. Note that by adjusting these definitions, more emphasis can be placed on models that predict fluctuations rather than models that are simply covering.

Referring again to FIG. 5, predictive metric evaluator 506 may also suggest the peak heights, i.e., the thresholds where the predicted probSLAViolation would probably be detecting the real application failures, to the network administrator via user interface(s) 510. For example, predictive metric evaluator 506 may suggest that the expert choose an upper threshold of 8% instead of 10% to tag true positives, false positives, and false negatives.

In further embodiments, application experience optimization process 248 may predict other events such as a MOS metric variation (similar to the probSLAViolation) or even a value of label reflecting the QoE (e.g., a "good" or "bad" experience label from the application.). In this case, there may be no need to employ a peak detector.

In another embodiment, predictive metric evaluator 506 may ask the network administrator via user interface(s) 510 for the threshold period of time that the prediction must be made before the event occurs. In the previous example, for an event to be flagged as a true positive, then prediction must occur at least 3 hours before the event. Such a period of time is important, since the prediction algorithm is likely to benefit from signal appearing right before the event. So, the choice of this period of time will highly influence the efficacy of the system. For instance, in some deployments, it may take an hour for the telemetry to be reported to the prediction engine, followed by a period of time of another hour to actually predict an application failure. In contrast, an online system may tolerate 10$s$ for the period of time.

Based on the above performance metrics, additional metrics such as the precision or recall of the prediction model could also be computed by predictive metric evaluator 506. In turn, predictive metric evaluator 506 may provide any or all of the model performance metrics for review to user interface(s) 510, as well as potential examples of such (e.g., FIG. 7A as an example of a true positive, etc.). Based on these examples and/or performance metrics, the network administrator may opt to revise the definitions until they deem that the application failure recognition by the system is considered acceptable.

In various embodiments, model selector 508 may be responsible for selecting the best model to be used by the predictive routing engine, based on its model performance metrics, and suggesting use of that model to the network administrator. In one embodiment, model selector 508 may also present the performance metrics for any or all of the possible prediction models for review via user interface(s) 510. In turn, a model may be selected by the network administrator for use in making (re)routing decisions for the traffic of an application. They may then accept the suggestion or examine the performance statistics and example predictions of many models to choose the right model. For instance, the administrator may select the model suggested by model selector 508 that has the highest number of paths where precision>90% and recall>50%.

Figure 9:
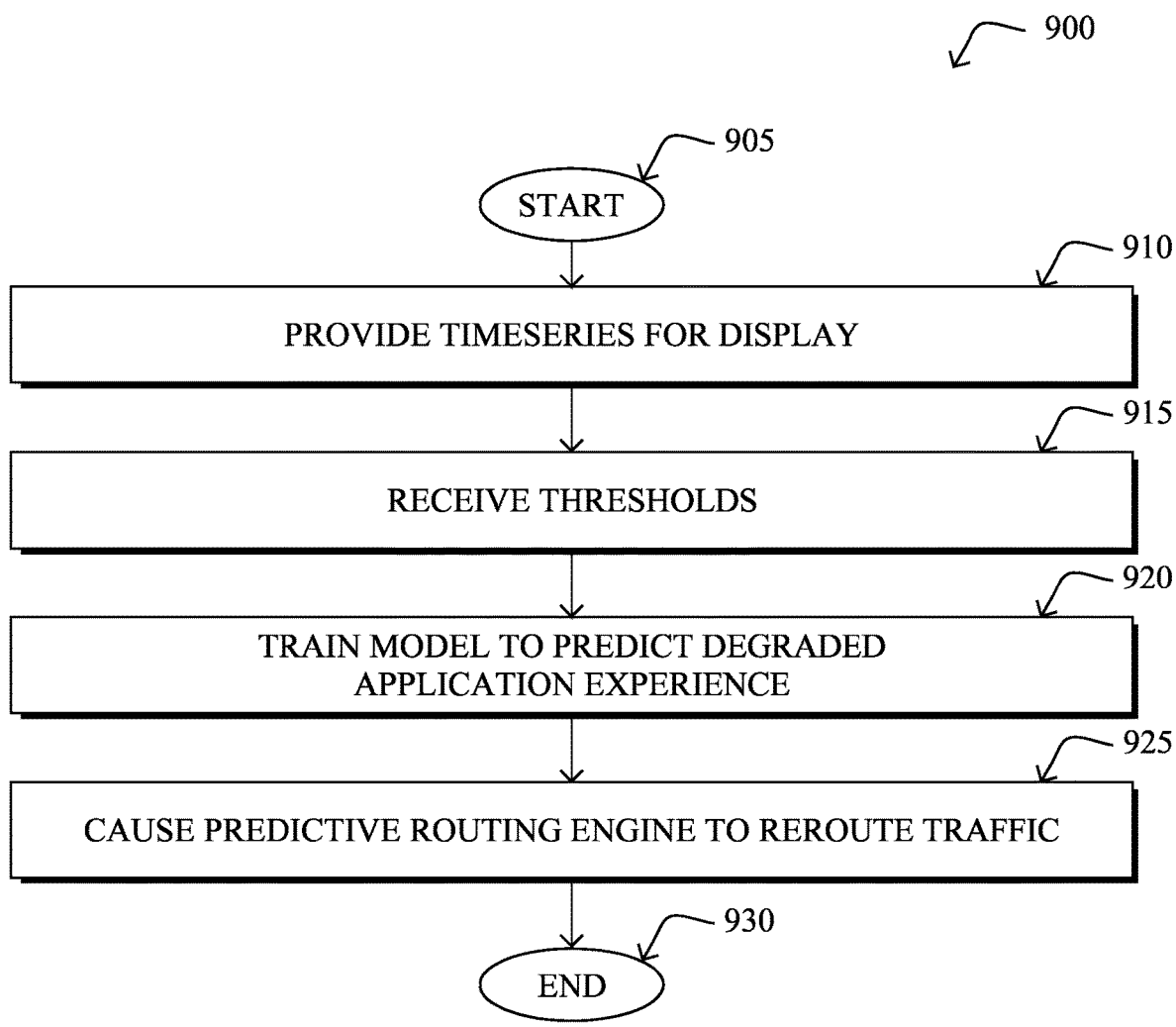
FIG. 9 illustrates an example simplified procedure for the automatic detection of application failures for forecasting network path performance.

FIG. 9 illustrates an example simplified procedure 900 (e.g., a method) for the automatic detection of application failures for forecasting network path performance, in accordance with one or more embodiments described herein. For example, a non-generic, specifically configured device (e.g., device 200), such as controller for a network (e.g., an SDN controller, a cloud-based device, etc.), an edge router, or other device in communication therewith, may perform procedure 900 by executing stored instructions (e.g., application experience optimization process 248). The procedure 900 may start at step 905, and continues to step 910, where, as described in greater detail above, the device may provide, to a user interface, a timeseries for display of a probability over time of a network path violating a service level agreement (SLA) associated with an online application. In some embodiments, the timeseries is based on one or more of: delay measured for the network path, loss measured for the network path, jitter measured for the network path, or a quality of experience metric obtained from the online application.

At step 915, as detailed above, the device may receive, from the user interface, a plurality of thresholds for the timeseries that define periods of time during which application experience of the online application is believed to be degraded. In various embodiments, the plurality of thresholds comprises one or more of: a lower threshold for the timeseries or an upper threshold for the timeseries. In another embodiment, the plurality of thresholds comprises a threshold duration of time. In one embodiment, the device may also suggest, via the user interface, at least one of the plurality of thresholds, in part by applying a peak detector to the timeseries. In a further embodiment, the device may also provide, to the user interface, an indication for display of the application experience as measured by the online application.

At step 920, the device may train, based on the plurality of thresholds, a machine learning model to predict when the application experience of the online application will be degraded, as described in greater detail above. In some embodiments, the device may also compute one or more performance metrics for the machine learning model and provide the one or more performance metrics for display by the user interface. In further embodiments, the device may also receive, from the user interface, an indication of an amount of time before predictions by the machine learning model should come true. In such a case, the one or more performance metrics for the machine learning model may be based on the indication.

At step 925, as detailed above, the device may cause a predictive routing engine to reroute traffic of the online application based on a prediction by the machine learning model that the application experience of the online application will be degraded. In various embodiments, the device may do so by providing, to the user interface, data regarding a plurality of machine learning models that include the machine learning model, and receiving from it a selection of the machine learning model from among the plurality of machine learning models. In some embodiments, the device may also receive, from the user interface, an adjustment to the plurality of thresholds, and train a new machine learning model based on the adjustment to the plurality of thresholds. Procedure 900 then ends at step 930.

It should be noted that while certain steps within procedure 900 may be optional as described above, the steps shown in FIG. 9 are merely examples for illustration, and certain other steps may be included or excluded as desired. Further, while a particular order of the steps is shown, this ordering is merely illustrative, and any suitable arrangement of the steps may be utilized without departing from the scope of the embodiments herein.

While there have been shown and described illustrative embodiments that provide for the automatic detection of application failures for forecasting network path performance, it is to be understood that various other adaptations and modifications may be made within the spirit and scope of the embodiments herein. For example, while certain embodiments are described herein with respect to using certain models for purposes of predicting application experience metrics, SLA violations, or other disruptions in a network, the models are not limited as such and may be used for other types of predictions, in other embodiments. In addition, while certain protocols are shown, other suitable protocols may be used, accordingly.

The foregoing description has been directed to specific embodiments. It will be apparent, however, that other variations and modifications may be made to the described embodiments, with the attainment of some or all of their advantages. For instance, it is expressly contemplated that the components and/or elements described herein can be implemented as software being stored on a tangible (non-transitory) computer-readable medium (e.g., disks/CDs/RAM/EEPROM/etc.) having program instructions executing on a computer, hardware, firmware, or a combination thereof. Accordingly, this description is to be taken only by way of example and not to otherwise limit the scope of the embodiments herein. Therefore, it is the object of the appended claims to cover all such variations and modifications as come within the true spirit and scope of the embodiments herein.

The invention claimed is:

1. A method comprising:
providing, by a device and to a user interface, a timeseries for display of a probability over time of a network path violating a service level agreement (SLA) associated with an online application;
receiving, at the device and from the user interface, a plurality of thresholds for the timeseries that define periods of time during which application experience of the online application is believed to be degraded;
training, by the device and based on the plurality of thresholds, a machine learning model to predict when the application experience of the online application will be degraded;
receiving, at the device and from the user interface, an indication of an amount of time before predictions by the machine learning model should come true; and
causing, by the device, a predictive routing engine to reroute traffic of the online application based on a prediction by the machine learning model that the application experience of the online application will be degraded.

2. The method as in claim 1, wherein the timeseries is based on one or more of: delay measured for the network path, loss measured for the network path, jitter measured for the network path, or a quality of experience metric obtained from the online application.

3. The method as in claim 1, wherein the plurality of thresholds comprises one or more of: a lower threshold for the timeseries or an upper threshold for the timeseries.

4. The method as in claim 1, wherein the plurality of thresholds comprises a threshold duration of time.

5. The method as in claim 1, further comprising:
receiving, at the device and from the user interface, an adjustment to the plurality of thresholds; and
training, by the device, a new machine learning model based on the adjustment to the plurality of thresholds.

6. The method as in claim 1, further comprising:
computing, by the device, one or more performance metrics for the machine learning model, wherein the one or more performance metrics for the machine learning model are based on the indication of the amount of time; and
providing, by the device, the one or more performance metrics for display by the user interface.

7. The method as in claim 1, wherein causing the predictive routing engine to reroute traffic of the online application comprises:
providing, by the device and to the user interface, data regarding a plurality of machine learning models that include the machine learning model; and
receiving, at the device and from the user interface, a selection of the machine learning model from among the plurality of machine learning models.

8. The method as in claim 1, further comprising:
suggesting, by the device and via the user interface, at least one of the plurality of thresholds, in part by applying a peak detector to the timeseries.

9. The method as in claim 1, further comprising:
providing, by the device and to the user interface, an indication for display of the application experience as measured by the online application.

10. An apparatus, comprising:
one or more network interfaces;
a processor coupled to the one or more network interfaces and configured to execute one or more processes; and
a memory configured to store a process that is executable by the processor, the process when executed configured to:
provide, to a user interface, a timeseries for display of a probability over time of a network path violating a service level agreement (SLA) associated with an online application;
receive, from the user interface, a plurality of thresholds for the timeseries that define periods of time during which application experience of the online application is believed to be degraded;
train, based on the plurality of thresholds, a machine learning model to predict when the application experience of the online application will be degraded; and
receive, from the user interface, an indication of an amount of time before predictions by the machine learning model should come true; and
cause a predictive routing engine to reroute traffic of the online application based on a prediction by the machine learning model that the application experience of the online application will be degraded.

11. The apparatus as in claim 10, wherein the timeseries is based on one or more of:
delay measured for the network path, loss measured for the network path, jitter measured for the network path, or a quality of experience metric obtained from the online application.

12. The apparatus as in claim 10, wherein the plurality of thresholds comprises one or more of: a lower threshold for the timeseries or an upper threshold for the timeseries.

13. The apparatus as in claim 10, wherein the plurality of thresholds comprises a threshold duration of time.

14. The apparatus as in claim 10, wherein the process when executed is further configured to:
receive, from the user interface, an adjustment to the plurality of thresholds; and
train a new machine learning model based on the adjustment to the plurality of thresholds.

15. The apparatus as in claim 10, wherein the process when executed is further configured to:
compute one or more performance metrics for the machine learning model, wherein the one or more performance metrics for the machine learning model are based on the indication of the amount of time; and
provide the one or more performance metrics for display by the user interface.

16. The apparatus as in claim 10, wherein the apparatus causes the predictive routing engine to reroute traffic of the online application by:
providing, to the user interface, data regarding a plurality of machine learning models that include the machine learning model; and
receive, from the user interface, a selection of the machine learning model from among the plurality of machine learning models.

17. The apparatus in claim 10, wherein the process when executed is further configured to:
suggest, via the user interface, at least one of the plurality of thresholds, in part by applying a peak detector to the timeseries.

18. A tangible, non-transitory, computer-readable medium storing program instructions that cause a device to execute a process comprising:
providing, by the device and to a user interface, a timeseries for display of a probability over time of a network path violating a service level agreement (SLA) associated with an online application;
receiving, at the device and from the user interface, a plurality of thresholds for the timeseries that define periods of time during which application experience of the online application is believed to be degraded;
training, by the device and based on the plurality of thresholds, a machine learning model to predict when the application experience of the online application will be degraded;
receiving, at the device and from the user interface, an indication of an amount of time before predictions by the machine learning model should come true; and
causing, by the device, a predictive routing engine to reroute traffic of the online application based on a prediction by the machine learning model that the application experience of the online application will be degraded.

* * * * *

UNITED STATES PATENT AND TRADEMARK OFFICE
CERTIFICATE OF CORRECTION

| | | |
|---|---|---|
| PATENT NO. | : 11,985,069 B2 | Page 1 of 1 |
| APPLICATION NO. | : 17/877987 | |
| DATED | : May 14, 2024 | |
| INVENTOR(S) | : Romain Kakko-Chiloff et al. | |

It is certified that error appears in the above-identified patent and that said Letters Patent is hereby corrected as shown below:

In the Specification

Column 11, Line 14 please amend as shown:
used for measuring the effectiveness of the predictive Signed and Sealed this
Thirty-first Day of December, 2024

Derrick Brent
*Acting Director of the United States Patent and Trademark Office*